US011414525B2

(12) United States Patent
Hartmann-Thompson et al.

(10) Patent No.: US 11,414,525 B2
(45) Date of Patent: Aug. 16, 2022

(54) HYPERBRANCHED POLYDIORGANOSILOXANE POLYOXAMIDE POLYMERS

(71) Applicant: 3M INNOVATIVE PROPERTIES COMPANY, St. Paul, MN (US)

(72) Inventors: Claire Hartmann-Thompson, Lake Elmo, MN (US); Audrey A. Sherman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 16/632,418

(22) PCT Filed: Aug. 13, 2018

(86) PCT No.: PCT/IB2018/056092
§ 371 (c)(1),
(2) Date: Jan. 20, 2020

(87) PCT Pub. No.: WO2019/043490
PCT Pub. Date: Mar. 7, 2019

(65) Prior Publication Data
US 2020/0231761 A1 Jul. 23, 2020

Related U.S. Application Data

(60) Provisional application No. 62/552,516, filed on Aug. 31, 2017.

(51) Int. Cl.
*C08G 77/24* (2006.01)
*C08G 83/00* (2006.01)
*C08G 77/14* (2006.01)
*C08G 77/26* (2006.01)
*C09J 183/10* (2006.01)

(52) U.S. Cl.
CPC ........... *C08G 83/005* (2013.01); *C08G 77/14* (2013.01); *C08G 77/24* (2013.01); *C08G 77/26* (2013.01); *C09J 183/10* (2013.01)

(58) Field of Classification Search
CPC ..... C08G 77/26; C08G 77/388; C08G 83/005
See application file for complete search history.

(56) References Cited

U.S. PATENT DOCUMENTS

| 2,676,182 A | 4/1954 | Daudt |
| 3,627,851 A | 12/1971 | Brady |
| 3,772,247 A | 11/1973 | Flannigan |
| 3,890,269 A | 6/1975 | Martin |
| 4,661,577 A | 4/1987 | Jo Lane |
| 4,728,571 A | 3/1988 | Clemens |
| 4,935,484 A | 6/1990 | Wolfgruber |
| 5,026,890 A | 6/1991 | Webb |
| 5,082,706 A | 1/1992 | Tangney |
| 5,110,890 A | 5/1992 | Butler |
| 5,214,119 A | 5/1993 | Leir |
| 5,223,465 A | 6/1993 | Ueki |
| 5,248,739 A | 9/1993 | Schmidt |
| 5,276,122 A | 1/1994 | Aoki |
| 5,302,685 A | 4/1994 | Tsumura |
| RE34,605 E | 5/1994 | Schrenk |
| 5,319,040 A | 6/1994 | Wengrovius |
| 5,360,659 A | 11/1994 | Arends |
| 5,461,134 A | 10/1995 | Leir |
| 5,512,650 A | 4/1996 | Leir |
| 5,579,162 A | 11/1996 | Bjornard |
| 5,882,774 A | 3/1999 | Jonza |
| 6,049,419 A | 4/2000 | Wheatley |
| 6,355,759 B1 | 3/2002 | Sherman |
| 6,384,172 B1 | 5/2002 | Dvornic |
| 6,531,620 B2 | 3/2003 | Brader |
| 6,534,600 B2 | 3/2003 | Dvornic |
| 6,534,615 B2 | 3/2003 | Schafer |
| 7,501,184 B2 | 3/2009 | Leir |
| 7,705,101 B2 | 4/2010 | Sherman |
| 8,063,166 B2 * | 11/2011 | Sherman ................ C09J 183/08 528/38 |
| 8,916,645 B2 | 12/2014 | Hu |
| 2008/0318057 A1 | 12/2008 | Sherman |
| 2008/0318058 A1 | 12/2008 | Sherman |
| 2016/0177037 A1 | 6/2016 | Huggins |

FOREIGN PATENT DOCUMENTS

JP 236234 2/1990

OTHER PUBLICATIONS

Encyclopedia of Polymer Science and Engineering, (265-270), 1989.
Podzimek, Light Scattering, Size Exclusion Chromatography and Asymmetric Flow Field Flow Fractionation: Powerful Tools for the Characterization of Polymers, Proteins and Nanoparticles, 84-93 (2011).
International Search Report for PCT International Application No. PCT/IB2018/056092, dated Nov. 6, 2018, 4 pages.

* cited by examiner

*Primary Examiner* — Margaret G Moore
(74) *Attorney, Agent, or Firm* — Jeffrey M. Olofson

(57) ABSTRACT

Hyperbranched polydiorganosiloxane polyoxamide polymers are formed from reaction mixtures containing $AX_g$ and $BZ_m$ compounds where either A or B is a siloxane-based group, and each X is either an oxalylamino-functional group or an amino-functional group, and each Z is either an amino-functional group or an oxylamino-functional group, such that upon reaction X and Z form an oxamide bond.

23 Claims, No Drawings

HYPERBRANCHED POLYDIORGANOSILOXANE POLYOXAMIDE POLYMERS

FIELD OF THE DISCLOSURE

This disclosure relates to hyperbranched siloxane-based polymers, and methods for preparing these polymers.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Typically the polydiorganosiloxane polymers are linear or branched polymers. Linear polydiorganosiloxane polymers are prepared from the reaction of difunctional monomers with difunctional monomers. Branched polydiorganosiloxane polymer are prepared from the reaction of difunctional monomers with a mixture of difunctional and higher functional monomers.

SUMMARY

Disclosed herein are hyperbranched polymers, methods of forming hyperbranched polymers and articles that include hyperbranched polymers. Among the hyperbranched polymers are hyperbranched polymers prepared from the reaction mixture comprising: $AX_g$ and $BZ_m$ wherein each X comprises either an oxalylamino-functional group of the formula:
—NH—(CO)—(CO)—OR$^2$, wherein each R$^2$ is independently an alkyl, haloalkyl, aryl, or aryl substituted with an alkyl, alkoxy, halo, or alkoxycarbonyl; and —(CO) is a carbonyl group, —C═O; or an amino-functional group of the formula: —NHR$^3$, wherein R$^3$ is an H, an alkyl, or aryl group; A comprises either a group with the formula: W(—[—OSi(R$^1$)$_2$—]$_n$—O—Si(R$^1$)$_2$—Y—)$_g$ wherein W is a single bond or a g-valent alkylene, arylene, heteroalkylene, or heteroarylene group; each R$^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and g is an integer of 2 or greater; or a g-valent alkylene, arylene, heteroalkylene, or heteroarylene group; where g is an integer of 2 or greater; B comprises either an m-valent alkylene, arylene, heteroalkylene, or heteroarylene group; or a group with the formula: W(—[—OSi(R$^1$)$_2$—]$_n$—O—Si(R$^1$)$_2$—Y—)$_m$ wherein W is an m-valent alkylene, arylene, heteroalkylene, or heteroarylene group; each R$^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and m is an integer of 3 or greater; each Z comprises either an amino-functional group of the formula: —NR$^3$H wherein R$^3$ is an H, an alkyl, or aryl group; or an oxalylamino-functional group of the formula: —NH—(CO)—(CO)—OR$^2$, wherein each R$^2$ is independently an alkyl, haloalkyl, aryl, or aryl substituted with an alkyl, alkoxy, halo, or alkoxycarbonyl; —(CO) is a carbonyl group —C═O; and m is an integer of 3 or greater; such that X and Z form a reactive combination of oxalylamino-functional and amino-functional groups.

Also disclosed are methods of forming hyperbranched polymers comprising providing a composition with compounds of the general Formula $AX_g$ and $BZ_m$ as described above, and mixing the compounds of $AX_g$ with the compounds of $BZ_m$, at room temperature to generate a hyperbranched polydiorganosiloxane polyoxamide polymer. Typically, the reaction mixtures comprise a molar excess of $Z_m$ groups relative to $X_g$ groups.

Also disclosed are articles that include the hyperbranched polydiorganosiloxane polyoxamide polymers described above. These articles may include additional additives, such as silicone tackifying resins to form adhesive articles, or polymers to form polymer blends. The hyperbranched polydiorganosiloxane polyoxamide polymer articles may be stand-alone articles or they may be articles that include layers of hyperbranched polydiorganosiloxane polyoxamide polymer.

DETAILED DESCRIPTION

Siloxane polymers (also often referred to as "silicones") have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. A wide range of siloxane polymers have been prepared for a wide range of uses, taking advantage of the unique properties of these materials.

Generally, the siloxane polymers are linear copolymers prepared from reaction mixtures that include a difunctional siloxane monomer or oligomer and a difunctional coreactive monomer or oligomer. By difunctional it is meant that the monomer or oligomer has two reactive groups. Examples of reactive groups for difunctional siloxane monomers or oligomers include hydroxyl groups and amine groups. These hydroxyl or amine groups react with difunctional isocyanate monomers or oligomers to generate copolymers with urethane (in the case of hydroxyl groups) or urea (in the case of amine groups) linking groups. Typically these types of copolymers are segmented copolymers, having the general repeating structure: -[siloxane group]-[linking group]-[isocyanate residue group]-[linking group]-, where the linking groups are urethane or urea groups and the siloxane group is the polydiorganosiloxane group present in the difunctional siloxane monomer or oligomer and the isocyanate residue group is that portion of difunctional isocyanate monomer or oligomer that links the two isocyanate groups.

Frequently these segmented copolymers are described using the "hard" and "soft" segment nomenclature. Using this type of nomenclature, generally the siloxane group is the soft segment and the linking groups and isocyanate residue groups form the hard segments. This nomenclature is descriptive because one of the unique and desirable features of siloxane groups is its flexibility and thus its "softness". Typically the isocyanate residue groups are either rigid aromatic groups or short aliphatic groups which are generally more rigid than siloxane groups. Additionally, the urethane or urea linking groups, besides being relatively rigid groups, also tend to interact with each other through hydrogen bonding. This hydrogen bonding interaction occurs because the hydrogen atoms that are bonded to nitrogen atoms in the urea or urethane linking group is a polarized bond with a partial positive charge on the H atom. This polarized H atom interacts with the oxygen groups of a carbonyl group on another urea or urethane linking group. Thus the polymer chains tend to interact with each other at the linking groups, which tends to make the linking group sites "hard" portions of the polymer chain since the polymers are more constrained at these sites than they would be in the absence of the hydrogen bonding interactions.

These copolymers can be modified by adding additional difunctional monomers or oligomers, such as diamines or diols, to introduce additional hard or soft segments. If for example a polyoxyalkylene diamine is added to the reaction mixture, the polyoxyalkylene segments introduced into the segmented copolymer are "soft" segments as they are more flexible than alkylene or aromatic segments. Likewise if an alkylene or aromatic diamine is added to the reaction mixture, this tends to introduce additional hard segments to the segmented copolymer.

Recently, polydiorganosiloxane segmented copolymers have been prepared using difunctional siloxane monomers or oligomers that have oxamide reactive groups. When these oxamide groups are reacted with diamines, linear polydiorganosiloxane polyoxamide segmented copolymers are produced. These copolymers are described for example in U.S. Pat. No. 7,501,184 (Leir et al.).

In some instances mixtures of diamines and higher functional amines are used to produce branched polydiorganosiloxane polyoxamide segmented copolymers. These branched polydiorganosiloxane polyoxamide segmented copolymers are primarily linear copolymers with occasional branch points as described for example in U.S. Pat. No. 7,705,101 (Sherman et al.).

There remains a need for a methods to produce highly branched polydiorganosiloxane polyoxamide segmented copolymers. While linear and lightly branched polydiorganosiloxane polyoxamide segmented copolymers have been successfully used in a wide range of applications, the properties of highly branched polydiorganosiloxane polyoxamide segmented copolymers are unknown. Due to the unique properties of siloxanes, it is anticipated that highly branched polydiorganosiloxane polyoxamide segmented copolymers will have properties not only different from linear polydiorganosiloxane polyoxamide segmented copolymers but also from other highly branched polymeric species.

Among the highly branched polymeric species that have been prepared are dendrimers. Dendrimers are repetitively branched molecules. A dendrimer is typically symmetric around the core, and often adopts a spherical three-dimensional morphology. It has been suggested that dendrimers can be employed in certain applications to achieve improved properties, such as thermoplastic processing characteristics, lower viscosity, and improved rheology, as compared with linear polymers having similar chemistry and molecular weight. However, dendrimers are monodisperse (typically having a polydispersity of less than about 1.02), highly defined molecules that are prepared by a series of controlled stepwise growth reactions which generally involve protect-deprotect strategies and purification procedures at the conclusion of each step. As a consequence, synthesis of dendrimers is a tedious and expensive process that places a practical limitation on their applicability.

Hyperbranched polymers are a relatively new class of materials that are similar to dendrimers. For example, U.S. Pat. No. 6,534,600 (Dvornic et al.) describes the synthesis of hyperbranched polyureas, polyurethanes, polyamidoamines, polyamides, and polyesters, U.S. Pat. No. 6,384,172 (Dvornic et al.) describes hyperbranched polycarbosilanes, carbosiloxanes, polycarbosilazenes, and copolymers thereof, and U.S. Pat. No. 8,916,645 (Hartmann-Thompson) describes hyperbranched polymers containing polyhedral oligosilsesquioxane branching units. In contrast to dendrimers, hyperbranched polymers are prepared in a one-step, one-pot procedure. This facilitates the synthesis of large quantities of materials, at high yields, and at a relatively low cost. Although the properties of hyperbranched polymers are different from those of dendrimers due to imperfect branching and larger polydispersities, hyperbranched polymers exhibit a degree of branching intermediate between that of linear polymers and dendrimers, and, therefore, exhibit thermoplastic processing and rheological properties that are comparable or for some applications superior to those of dendrimers. Accordingly, hyperbranched polymers have been perceived as being useful in certain applications as a lower cost alternative to dendrimers.

Disclosed herein are hyperbranched polydiorganosiloxane polyoxamide segmented copolymers, methods of preparing these hyperbranched polydiorganosiloxane polyoxamide segmented copolymers, and articles that contain hyperbranched polydiorganosiloxane polyoxamide segmented copolymers. The hyperbranched polydiorganosiloxane polyoxamide segmented copolymers have a variety of desirable properties similar to non-hyperbranched polydiorganosiloxane polyoxamide segmented copolymers, as well as properties not achievable with non-hyperbranched polydiorganosiloxane polyoxamide segmented copolymers. Among the desirable properties similar to those of non-hyperbranched polydiorganosiloxane polyoxamide segmented copolymers include optical transparency, high moisture vapor transmission, thermal stability, and stability to UV radiation except for UV C radiation. Properties that are different from non-hyperbranched polydiorganosiloxane polyoxamide segmented copolymers include solubility in a wide range of solvents, different melt behaviors, and since they are polyfunctional, can be functionalized with a wide range of endgroups.

The terms "a", "an", and "the" are used interchangeably with "at least one" to mean one or more of the elements being described.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—$NR^d$— where each (CO) denotes a carbonyl group and $R^d$ is hydrogen, alkyl, or part of a heterocyclic group along with the nitrogen to which they are both attached. In most embodiments, $R^d$ is hydrogen or alkyl. In many embodiments, $R^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "siloxane-based" refers to polymers or polymer segments that contain siloxane groups. As mentioned above, the terms "siloxane" and "silicone" are used interchangeably and refer to polymers or polymer precursors which contain siloxane units. Siloxane units refer to dialkyl or diaryl siloxane (—$SiR_2O$—) repeating units.

The term "polydiorganosiloxane" refers to a divalent segment of formula

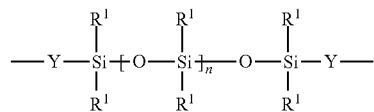

or a higher valent segment of the formula

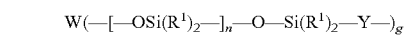

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500, W is a g-valent alkylene, arylen, hetroalkylene, or heteroarylene group; g is an integer of 3 or greater.

The term "adhesive" as used herein refers to polymeric compositions useful to adhere together two adherends. Examples of adhesives are viscoelastic adhesives such as heat activated adhesives and pressure sensitive adhesives, as well as thermoplastic adhesives such as hot melt adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Hot melt adhesives are a different class of adhesives, separate from the viscoelastic heat activated and pressure sensitive adhesives described above. Hot melt adhesives are thermoplastic adhesives that are applied in a molten state and form a bond upon cooling to a solid state. Hot melt adhesives and heat activated adhesive are different classes of materials.

The term "optically transparent" as used herein refers to refers to a material that is clear to the human eye. An optically transparent material often has a luminous transmission of at least about 80 percent, and a haze of no more than about 10 percent in the 400 to 700 nm wavelength range. Both the luminous transmission and the haze can be determined using, for example, the method of ASTM-D 1003-95.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is well understood by one of skill in the art.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The present disclosure includes hyperbranched polydiorganosiloxane polyoxamide segmented copolymers, methods of preparing hyperbranched polydiorganosiloxane polyoxamide segmented copolymers, and articles that include hyperbranched polydiorganosiloxane polyoxamide segmented copolymers.

The increasing rigorous demands upon polymeric materials has driven the development of new classes of polymeric materials. Besides the development of new classes of polymeric materials, there is similarly a need for polymeric materials with different architectures. In particular, highly branched polymeric materials are desirable because it has been discovered that merely changing the architecture of a polymeric material can drastically change its properties. For example, polypropylene is a well-known and understood thermoplastic polymeric material with a melting point of 130-171° C. depending upon the amounts of isotactic and syndiotactic content. Atactic polypropylene on the other hand is an amorphous, rubbery material. All of these materials are chemically the same, but their different architectures give them vastly different properties. Another example involves polyester materials, where polymer-coating compositions comprising a highly branched polyester have a lower viscosity and better shear thinning properties for coating applications than similar compositions containing a chemically similar linear polyester having the same molecular weight and same concentration. Therefore the preparation of highly branched polymeric materials is desirable.

One method of synthesizing branched polymers is to use polyfunctional monomers (i.e., monomers having three or more functional groups) during polymerization. However, this method may result in the production of gelled or thermoset cross-linked materials that do not exhibit good processability characteristics, and which are insoluble.

It has been suggested that dendrimers can be employed in certain applications to achieve improved properties, such as thermoplastic processing characteristics, lower viscosity, and improved rheology, as compared with linear polymers having similar chemistry and molecular weight. However, dendrimers are monodisperse (typically having a polydispersity of less than about 1.02), highly defined molecules that are prepared by a series of controlled stepwise growth reactions which generally involve protect-deprotect strategies and purification procedures at the conclusion of each step. As a consequence, synthesis of dendrimers is a tedious and expensive process that places a practical limitation on their applicability.

In contrast to dendrimers, hyperbranched polymers are prepared in a one-step, one-pot procedure. This facilitates the synthesis of large quantities of materials, at high yields, and at a relatively low cost. Although the properties of hyperbranched polymers are different from those of dendrimers due to imperfect branching and larger polydispersities, hyperbranched polymers exhibit a degree of branching intermediate between that of linear polymers and dendrimers, and, therefore, exhibit thermoplastic processing and rheological properties that are comparable or for some applications superior to those of dendrimers. Accordingly, hyperbranched polymers have been perceived as being useful in certain applications as a lower cost alternative to dendrimers.

In this disclosure, hyperbranched polydiorganosiloxane polyoxamide segmented copolymers are prepared. The hyperbranched polydiorganosiloxane polyoxamide segmented copolymers are prepared from difunctional and/or polyfunctional monomers having functional groups of one type (X) without any other functional groups that react significantly during the polymerization process, and difunctional and/or polyfunctional monomers having functional groups of another type (Z) that react with a functional groups of the first type (X) without any other functional groups that react significantly during the polymerization process. In the present disclosure, either the X groups or the Z groups are amino groups (—$NR^3H$) where $R^3$ is a hydrogen, alkyl or aryl group, and the complimentary group is an oxalylamino-functional group of the formula: —NH—(CO)—(CO)—$OR^2$, where each $R^2$ is independently an alkyl, haloalkyl, aryl, or aryl substituted with an alkyl, alkoxy, halo, or alkoxycarbonyl; (CO) is a carbonyl group C=O. By complimentary groups it is meant that if X is an amino group, Z is an oxalylamino-functional group, and vice versa. More specifically, the hyperbranched copolymers of this disclosure are prepared from a reaction mixture comprising $AX_g$ and $BZ_m$, where X and Z are described above, g and m are integers which each have a value of at least 2, and at least one of g and m is an integer having a value of at least 3. Each A is a g-valent linking group and each B is an m-valent linking group. A wide variety of linking groups are suitable for the groups A and B, at least one of which is a polydiorganosiloxane group.

The hyperbranched polymers of this disclosure are prepared from a reaction mixture comprising $AX_g$ and $BZ_m$. A wide range of $AX_g$ and $BZ_m$ are suitable. Typically either the A groups or the B groups are siloxane-based.

For $AX_g$ each X comprises either an oxaylamino-functional group or an amino functional group, and A is a g-valent linking group. In $AX_g$, each X group comprises either: an oxaylamino-functional group of the formula: —NH—(CO)—(CO)—$OR^2$, where each $R^2$ is independently an alkyl, haloalkyl, aryl, or aryl substituted with an alkyl, alkoxy, halo, or alkoxycarbonyl; and (CO) is a carbonyl group C=O; or an amino-functional group of the formula: —$NHR^3$, where $R^3$ is an H, an alkyl, or aryl group. The group A comprises either: a siloxane-based group with the formula: $W(—[—OSi(R^1)_2—]_n—O—Si(R^1)_2—Y—)_g$ where W is a single bond or a g-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each subscript n is independently an integer of 0 to 1500; and g is an integer of 2 or greater; or the group A is a g-valent alkylene, arylene, heteroalkylene, or heteroarylene group; where g is an integer of 2 or greater.

In the group $BZ_m$, the group B comprises either an m-valent alkylene, arylene, heteroalkylene, or heteroarylene group; or the group B comprises a group with the formula: $W(—[—OSi(R^1)_2—]_n—O—Si(R^1)_2—Y—)_m$ where W is an m-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and m is an integer of 3 or greater; each Z comprises either an amino-functional group of the formula: —$NR^3H$ where $R^3$ is an H, an alkyl, or aryl group; or an oxylamino-functional group of the formula: —NH—(CO)—(CO)—$OR^2$, where each $R^2$ is independently an alkyl, haloalkyl, aryl, or aryl substituted with an alkyl, alkoxy, halo, or alkoxycarbonyl; (CO) is a carbonyl group C=O; and m is an integer of 3 or greater.

As was mentioned above, when X is an oxylamino-functional group, Z is an amino group, and when Z is an oxylamino-functional group, X is an amino group.

In this disclosure, three different scenarios for different combinations of $AX_g$ and $BZ_m$ will be presented. In Scenario One, $AX_g$ is a compound where A is siloxane-based and X is an oxaylamino-functional group, and therefore $BZ_m$ is a compound where B is a non-siloxane-based group and Z is an amino functional group. The most typical situation for Scenario One is for g to equal 2 and m to equal an integer of 3 or greater.

A second scenario, called Scenario Two, $AX_g$ is a compound where A is non-siloxane-based and X is an oxaylamino-functional group, and therefore $BZ_m$ is a compound where B is a siloxane-based group and Z is an amino functional group. The most typical situation for Scenario One is for g to equal 2 and m to equal an integer of 3 or greater.

A third scenario, called Scenario Three, $AX_g$ is a compound where A is siloxane-based and X is an amino functional group, and therefore $BZ_m$ is a compound where B is a non-siloxane-based group and Z is an oxalylamino-functional group. The most typical situation for Scenario Three is for g to equal 2 and m to equal an integer of 3 or greater.

In some embodiments of Scenario One, the compounds $AX_g$ comprise oxalylamino-functional compounds of Formula I:

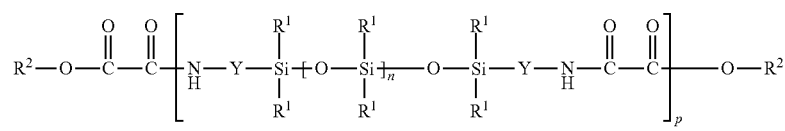

Formula I where each $R^1$ is independently an alkyl, haloalkyl, aralkyl, alkenyl, aryl, or aryl substituted with an alkyl, alkoxy, or halo; each $R^2$ is independently an alkyl, haloalkyl, aryl, or aryl substituted with an alkyl, alkoxy, halo, or alkoxycarbonyl; each Y is independently an alkylene, aralkylene, or a combination thereof; the subscript n is independently an integer of 0 to 1500; and the subscript p is an integer of 1 to 10.

The compound of Formula I can include a single compound (i.e., all the compounds have the same value of p and n) or can include a plurality of compounds (i.e., the compounds have different values for p, different values for n, or different values for both p and n). Compounds with different n values have siloxane chains of different length. Compounds having a p value of at least 2 are chain extended.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula I, at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group $R^2$ can be an alkyl, haloalkyl, aryl, or aryl substituted with an alkyl, alkoxy, halo, or alkoxycarbonyl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2, 2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The polydiorganosiloxane-containing compound of Formula I can be prepared by any known method. In some embodiments, this precursor is prepared according to Reaction Scheme A.

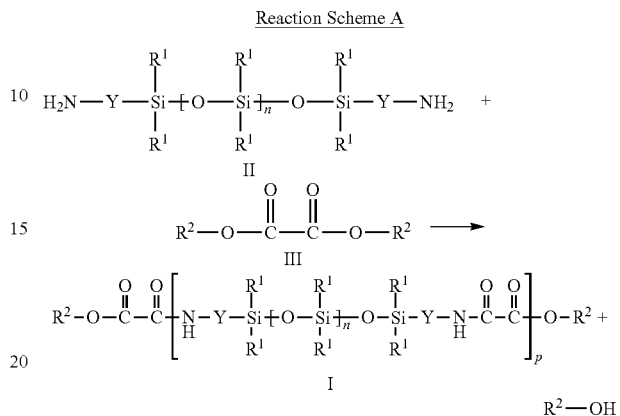

A polydiorganosiloxane diamine of Formula II (p moles) is reacted with a molar excess of an oxalate of Formula III (greater than p+1 moles) under an inert atmosphere to produce the polydiorganosiloxane-containing compound of Formula I and $R^2$—OH by-product. In this reaction, $R^1$, Y, n, and p are the same as previously described for Formula I. Each $R^2$ in Formula III is independently an alkyl, haloalkyl, aryl, or aryl substituted with an alkyl, alkoxy, halo, or alkoxycarbonyl. The preparation of the compound of Formula I according to Reaction Scheme B is further described in U.S. Pat. No. 7,501,184 (Leir et al.).

The polydiorganosiloxane diamine of Formula II in Reaction Scheme A can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), U.S. Pat. No. 6,355,759 (Sherman et al.), U.S. Pat. Nos. 6,531,620 and 6,534,615 (Brader et al.), and US Patent Publication No. 2016/0177037 (Huggins et al.). Some polydiorganosiloxane diamines are commercially available, for example, from Shin Etsu Silicones of America, Inc., Torrance, Calif. and from Gelest Inc., Morrisville, Pa., and Wacker Chemicals, Munich, Germany.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethyl siloxane diamine, polydivinylsiloxane diamine, polyvinylmethylsiloxane diamine, poly(5-hexenyl)methylsiloxane diamine, and mixtures thereof.

In Reaction Scheme A, an oxalate of Formula III is reacted with the polydiorganosiloxane diamine of Formula II under an inert atmosphere. The two $R^2$ groups in the oxalate of Formula IV can be the same or different. In some methods, the two $R^2$ groups are different and have different reactivity with the polydiorganosiloxane diamine of Formula III in Reaction Scheme A.

Group R² can be an alkyl, haloalkyl, aryl, or aryl substituted with an alkyl, alkoxy, halo, or alkoxycarbonyl. Suitable alkyl and haloalkyl groups for R² often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for R² include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The oxalates of Formula III in Reaction Scheme A can be prepared, for example, by reaction of an alcohol of formula R²—OH with oxalyl dichloride. Commercially available oxalates of Formula III (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl) oxalate, bis(pentafluorophenyl) oxalate, 1-(2,6-difluorophenyl)-2-(2,3,4,5,6-pentachlorophenyl) oxalate, and bis(2,4,6-trichlorophenyl) oxalate.

A molar excess of the oxalate is used in Reaction Scheme A. That is, the molar ratio of oxalate to polydiorganosiloxane diamine is greater than the stoichiometric molar ratio, which is (p+1): p. The molar ratio is often greater than 2:1, greater than 3:1, greater than 4:1, or greater than 6:1. The condensation reaction typically occurs under an inert atmosphere and at room temperature upon mixing of the components.

The condensation reaction used to produce the compound of Formula I (i.e., Reaction Scheme A) can occur in the presence or absence of a solvent. In some methods, no solvent or only a small amount of solvent is included in the reaction mixture. In other methods, a solvent may be included such as, for example, toluene, tetrahydrofuran, dichloromethane, or aliphatic hydrocarbons (e.g., alkanes such as hexane).

Removal of excess oxalate from the compound of Formula I is generally desirable. The excess oxalate can typically be removed from the precursor using a stripping process. For example, the reacted mixture (i.e., the product or products of the condensation reaction according to Reaction Scheme A) can be heated to a temperature up to 150° C., up to 175° C., up to 200° C., up to 225° C., or up to 250° C. to volatilize the excess oxalate. A vacuum can be pulled to lower the temperature that is needed for removal of the excess oxalate. The compounds of Formula I tend to undergo minimal or no apparent degradation at temperatures in the range of 200° C. to 250° C. or higher. Any other known methods of removing the excess oxalate can be used.

The by-product of the condensation reaction shown in Reaction Scheme A is an alcohol (i.e., R²—OH is an alcohol). Group R² is often limited to an alkyl having 1 to 4 carbon atoms, a haloalkyl having 1 to 4 carbon atoms, or an aryl such as phenyl that form an alcohol that can be readily removed (e.g., vaporized) by heating at temperatures no greater than about 250° C. Such an alcohol can be removed when the reacted mixture is heated to a temperature sufficient to remove the excess oxalate of Formula III.

When the $AX_g$ compound is a compound of Formula I, the $BZ_m$ compound is a polyamine where m is an integer of at least 3. In these embodiments, B comprises an m-valent alkylene, arylene, heteroalkylene, or heteroarylene group; and each Z comprises an amino-functional group of the formula: —NR³H where R³ is an H, an alkyl, or aryl group. In some embodiments, m is 3, B is an alkylene or heteroalkylene and each R³ is an H. In some embodiments, B is a heteroalkylene group with 6-20 carbon atoms and at least one heteroatom, typically a nitrogen. An example of a suitable $BZ_m$ compound is tris(2-aminoethyl) amine.

In some embodiments, m is an integer greater than 3, and the $BZ_m$ compound is a tetra-amine, a penta-amine or an even higher functional amine.

In embodiments of Scenario Two, the reaction mixture comprises an $AX_g$ compound comprises a group where A comprises a g-valent alkylene, arylene, heteroalkylene, or heteroarylene group that is not siloxane-based. In these embodiments, the X groups are oxalylamino-functional groups. In these embodiments, each X comprises an oxalylamino-functional group of the formula: —NH—(CO)—(CO)—OR², where each R² is independently an alkyl, haloalkyl, aryl, or aryl substituted with an alkyl, alkoxy, halo, or alkoxycarbonyl; (CO) is a carbonyl group C=O; where g is an integer of 2. In some embodiments, g is an integer of 2, and A comprises an alkylene, arylene, heteroalkylene, or heteroarylene group.

In some embodiments of Scenario Two, the compounds $AX_g$ comprise oxalylamino-functional compounds of Formula IV:

Formula IV

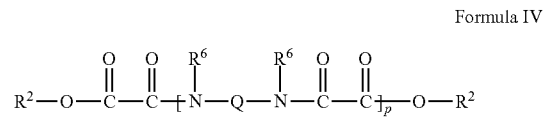

In Formula IV, the each R² is independently an alkyl, haloalkyl, aralkyl, substituted aralkyl, alkenyl, aryl, substituted aryl, or imino of formula —N=CR⁴R⁵, where R⁴ is hydrogen, alkyl, aralkyl, substituted aralkyl, aryl, or substituted aryl, and R⁵ is an alkyl, aralkyl, substituted aralkyl, aryl, or substituted aryl. Each R⁶ is independently hydrogen, alkyl, aralkyl, aryl, or part of a heterocyclic group that includes Q and the nitrogen to which R⁶ is attached (the nitrogen is the heteroatom of the heterocyclic group). Group Q is (a) an alkylene, (b) arylene, (c) a carbonylamino group linking a first group to a second group, wherein the first group and the second group are each independently an alkylene, arylene, or a combination thereof, (d) part of a heterocyclic group that includes R⁶ and the nitrogen to which R⁶ is attached, or (e) a combination thereof. The subscript p is an integer of 1 to 10.

Suitable alkyl and haloalkyl groups for R² often have 1 to 10, 1 to 6, or 1 to 4 carbon atoms. Although tertiary alkyl (e.g., tert-butyl) and tertiary haloalkyl groups can be used, a primary or secondary carbon atom is often attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or fluoroalkyl groups can be 2-chloroethyl, 2,2,2-trichloroethyl, 3-chloropropyl, 4-chlorobutyl, fluoromethyl, 2-fluoroethyl, 2,2-difluoroethyl, 2,2,2-trifluoroethyl, 1-(trifluoromethyl)-2,2,2-trifluorethyl, 3-fluoropropyl, 4-fluorobutyl, and the like.

Suitable alkenyl groups for $R^2$ often have 2 to 10, 2 to 8, 2 to 6, or 2 to 4 carbon atoms. Exemplary alkenyl groups include ethenyl, propenyl, butenyl, and pentenyl.

Suitable aryl groups for $R^2$ include those having 6 to 12 carbon atoms such as, for example, phenyl. The aryl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable aralkyl groups for $R^2$ include those having an alkyl group with 1 to 10 carbon atoms and an aryl group with 6 to 12 carbon atoms. For example, the aralkyl can be an alkyl having 1 to 10 carbon atoms or 1 to 4 carbon atoms substituted with phenyl. The aryl portion of the aralkyl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable imino groups for $R^2$ are monovalent groups of formula $-N=CR^4R^5$. Suitable alkyl groups for either $R^4$ or $R^5$ can be linear or branched and typically contain 1 to 10 carbon atoms, 1 to 8 carbon atoms, 1 to 6 carbon atoms, or 1 to 4 carbon atoms. Suitable aryl, substituted aryl, aralkyl, and substituted aralkyl groups for $R^4$ or $R^5$ are the same as those describe above for $R^2$.

Each $R^6$ group in Formula IV independently can be hydrogen, alkyl, aralkyl, aryl, or part of a heterocyclic group that includes Q and the nitrogen to which $R^6$ is attached. Suitable alkyl groups can be linear or branched and typically contain 1 to 10 carbon atoms, 1 to 8 carbon atoms, 1 to 6 carbon atoms, or 1 to 4 carbon atoms. Suitable aryl groups typically include those having 6 to 12 carbon atoms. The aryl group is often phenyl. Suitable aralkyl groups include those having an alkyl group with 1 to 10 carbon atoms substituted with an aryl group having 6 to 12 carbon atoms. Exemplary aralkyl groups often include an alkyl having 1 to 10 carbon atoms or 1 to 4 carbon atoms substituted with a phenyl. When $R^6$ is part of a heterocyclic group that includes Q and the nitrogen to which $R^6$ is attached, the heterocyclic group typically is saturated or partially saturated and contains at least 4, at least 5, or at least 6 ring members.

Group Q in Formula IV is (a) an alkylene, (b) arylene, (c) a carbonylamino group linking a first group to a second group, wherein the first group and the second group are each independently an alkylene, arylene, or a combination thereof, (d) part of a heterocyclic group that includes $R^6$ and the nitrogen to which $R^6$ is attached, or (e) a combination thereof. Any suitable alkylene can be used for Q. Exemplary alkylene groups often have at least 2 carbon atoms, at least 4 carbon atoms, at least 6 carbon atoms, at least 10 carbon atoms, or at least 20 carbon atoms. Any suitable arylene can be used for Q. Exemplary arylenes often have 6 to 12 carbon atoms and include, but are not limited to, phenylene and biphenylene.

The group Q can be a combination of one or more alkylenes with one or more arylenes. An aralkylene (i.e., a group having an alkylene bonded to an arylene) is a particular combination of one alkylene and one arylene. Other combinations can include, for example, an arylene and two alkylenes such as the group -alkylene-arylene-alkylene-, which can be considered to be an -alkylene-aralkylene- group. In some examples, this group can be of formula $-C_xH_{2x}-C_6H_4-C_xH_{2x}-$ where x is an integer in the range of 1 to 10. One particular example is the group $-CH_2-C_6H_4-CH_2-$.

When group Q includes a carbonylamino group, this group can be of formula $-Q^a-(CO)NR^6-Q^a-$ where each $Q^a$ is independently an alkylene, arylene, or combination thereof. Multiple such groups can be linked such as, for example, $-Q^{3a}-(CO)NR^6-Q^{3a}-(CO)NR^6-Q^{3a}-$ and $-Q^{3a}-(CO)NR^6-Q^{3a}-(CO)NR^2-Q^{3a}-(CO)NR^6-Q^{3a}-$.

Some Q groups combine with both the $R^6$ group and the nitrogen atom to which they are both attached to form a heterocylic group. The heterocylic group often has at least 4, at least 5, or at least 6 ring atoms. The heterocyclic group can be unsaturated or partially saturated. One or both of the nitrogen atoms attached to Q can be part of the heterocyclic group. One exemplary heterocyclic group is the divalent group derived from piperizine.

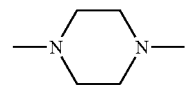

The compound of Formula IV can be prepared by the condensation reaction of an oxalate with an organic amine.

In the embodiments of Scenario Two, in the $BZ_m$ compounds, B comprises an m-valent siloxane-based group with the formula: $W(-[-OSi(R^1)_2-]_n-O-Si(R^1)_2-Y-)_m$ where W is an m-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and each Z comprises a $-NR^3H$ group; where $R^3$ is an H, an alkyl, or aryl group; and m is an integer of 3 or greater. Examples of group with the formula: $W(-[-OSi(R^1)_2-]_n-O-Si(R^1)_2-Y-)_m$ where m is 3 or greater include amine-functional graft copolymers such as are described in U.S. Pat. No. 4,728,571 (Clemens et al.) and amino-functional silsequioxanes, such as amino-functional polyhedral oligomeric silsequioxanes (POSS).

In embodiments of Scenario Three, the reaction mixture comprises an $AX_g$ compound comprises a polydiorganosiloxane diamine of Formula II:

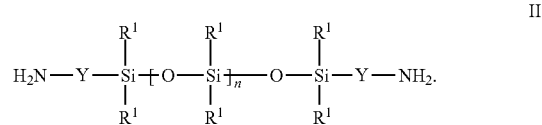

Formula II has been described above as a synthon used in the formation of the compound of Formula I.

In the embodiments of Scenario Three, in the $BZ_m$ compounds, B comprises an m-valent alkylene, arylene, heteroalkylene, or heteroarylene group that is not siloxane-based. In these embodiments, the Z groups are oxalylamino-functional groups. In these embodiments, each Z comprises an oxalylamino-functional group of the formula: —NH—(CO)—(CO)—OR$^2$, where each R$^2$ is independently an alkyl, haloalkyl, aryl, or aryl substituted with an alkyl, alkoxy, halo, or alkoxycarbonyl; (CO) is a carbonyl group C=O; where m is an integer of 3 or greater.

In the reaction mixtures used to prepare the hyperbranched polymers of this disclosure, a wide range of stoichiometries are suitable for forming the hyperbranched polymers. In general, the reaction mixtures comprises a molar excess of $Z_m$ groups relative to $X_g$ groups. This stoichiometry is utilized to generate hyperbranched polymers and avoid gelation.

Hyperbranched polymers are polymers having branches upon branches. More specifically, a hyperbranched polymer contains a mixture of linearly and fully branched repeating units, whereas an ideal dendrimer contains only fully branched repeating units, without any linearly repeating units, and ideal linear polymers contain only linear repeating units, without any branched repeating units. The degree of branching (DB), which reflects the fraction of branching sites relative to a perfectly branched system (i.e., an ideal dendrimer), for a hyperbranched polymer is greater than zero and less than 1, with typical values being from about 0.25 to 0.45.

The average degree of branching (DB) is defined as the number average fraction of branching groups per molecule, i.e., the ratio of terminal groups plus branched groups to the total number of terminal groups, branched groups, and linear groups. For ideal dendrons and dendrimers the degree of branching is 1. For ideal linear polymers the degree of branching is 0. The degree of branching is expressed mathematically as follows:

$$\overline{DB} = \frac{N_t + N_b}{N_t + N_b + N_l}$$

where $N_t$ represents the number of terminal units, $N_b$ represents the number of branched units, and $N_l$ represents the number of linear units.

Unlike ideal dendrimers which have a polydispersity of 1, hyperbranched polymers have a polydispersity that increases with increasing molecular weight, with typical polydispersities being greater than 1.1 even at a relatively low molecular weight such as 1,000 Daltons, and with polydispersities greater than 2 being typical for hyperbranched polymers having a molecular weight of about 10,000 Daltons or higher. These differences between the polydispersities and degree of branching of hyperbranched polymers verses dendrimers is indicative of the relatively higher non-ideality, randomness and irregularity of hyperbranched polymers as compared with dendrimers, and distinguishes hyperbranched polymers from dendrimers.

An important aspect of this disclosure relates to control of the polymerization process to prevent gelation (i.e., cross-linking) of the copolymer. For the copolymerization processes of this disclosure, the ratio (r) of X-groups to Z-groups (r=X/Z), and/or the extent of reaction (p) are selected so as to avoid cross-linking. A hyperbranched polymerization system can be approximately modeled by assuming that (a) X-groups only react with Z-groups, and Z-groups only react with X-groups, (b) cyclization reactions do not occur, (c) all X-groups exhibit equal reactivity regardless of the size and shape of the molecule to which they are attached, and (d) all Z-groups exhibit equal reactivity regardless of the size and shape of the molecule to which they are attached. Using these assumptions for the general system $X_g + Z_m$, it can be theoretically determined that complete conversion of the minor component can be achieved without gelation if $1/[(g-1)(m-1)] \geq r \geq (g-1)(m-1)$. As an example, complete conversion of the minor component can be achieved for an $X_2 + Z_3$ system without gelation when the ratio of X-groups to Z-groups is less than 0.5 or greater than 2. As an alternative, gelation can be avoided by controlling the extent of conversion (completion) of the reaction. As an example, for an $X_g + Z_m$ system, it can be theoretically determined that gelation can be avoided when r=1 (i.e., the number or concentration of X-groups is equal to the number or concentration of Z-groups) if the extent of reaction (p) is less than $[1/(g-1)(m-1)]^{1/2}$. For example, for an $X_2 + Z_3$ system in which the number of X and Z groups are equal, gelation can be avoided if the reaction is terminated at or below about 70% completion. Methods of quenching, or otherwise stopping a polymerization reaction at a desired extent of conversion are known and will not be described in detail.

Generally, gelation can be avoided by selecting the extent of reaction (p), the ratio of reactive groups (r), the number of X-functional groups per molecule of X-functional monomer (g), and the number of Z-functional groups per molecule of Z-functional monomer (m) so that the relation $rp^2 \leq 1/[(g-1)(m-1)]$ is satisfied. In the case where either X-groups or Z-groups are in excess (i.e., r≠1), the extent of reaction (p) is determined with respect to the minor reactant (the lesser of X and Z), and r is the ratio of the minor to the major component.

Because the above relationships are dependent on assumptions that only approximate real systems, the actual degree of conversion that can be achieved for a given ratio of X-groups to Z-groups before gelation occurs tends to be slightly higher than the theoretically predicted conversion. However, the theoretically determined conversion is an excellent starting point from which to conduct experiments to determine the actual allowable extent of conversion before gelation occurs. Similarly, the allowed ranges for the ratio of X-groups to Z-groups for a given extent of conversion without the occurrence of gelation for a real system may be somewhat broader than the theoretically predicted ranges. However, the theoretically predicted ranges provide an excellent starting point for a series of experiments to determine how close to r=1 a system can be before gelation occurs.

Also disclosed are methods of preparing hyperbranched polydiorganosiloxane polyoxamide copolymers. These methods comprise providing a composition with compounds of the general Formula $AX_g$, providing a composition with compounds of general Formula $BZm$, mixing the compounds of $AX_g$ with the compounds of $BZ_m$, at room temperature to generate a hyperbranched polydiroganosiloxane polyoxamide copolymer.

The compositions of $AX_g$ and $BZ_m$ have been discussed in detail above. Each of the three scenarios described above are carried out by the same general method. The polymerization processes may be performed using bulk or solution polymerization techniques. The monomers may be added to a reaction vessel either together or separately, and may be added all at once, incrementally, or continuously. The copolymerization reactions of this disclosure are generally carried out as a batch process in a single reaction vessel. However, it is contemplated that the processes may be amenable to continuous reaction processes, such as continuous stirred tank reactors and plug flow reactors. However, the processes do not encompass an iterative sequence of reactions and separations of the type associated with the synthesis of dendrimers.

The hyperbranched polymers prepared will typically have a degree of branching of less than 55%, and more typically from about 25% to about 45%. Their typical polydispersities may range from about 1.1 for lower molecular weight hyperbranched polymers (e.g., those having a molecular weight of about 1,000 Daltons) to 2 or higher for higher molecular weight hyperbranched polymers (e.g. those having a molecular weight of 10,000 Daltons or more). The hyperbranched polymers that are prepared typically have a weight average molecular weight of about 25,000 Daltons or less. However, higher molecular weight hyperbranched polymers can be prepared. The typical molecular weights for the hyperbranched polymers prepared are from about 1,000 (weight average) to about 25,000 (weight average), and more typically from about 1,000 to about 10,000 Daltons (weight average).

Also disclosed herein are articles prepared from the hyperbranched polymers described above. A wide range of articles can be prepared utilizing the hyperbranched polymers of this disclosure. The articles include ones comprising the hyperbranched polymer by itself formed into a shape, ones comprising blends and mixtures of the hyperbranched polymer with one or more additional materials, either polymeric and non-polymeric materials, as well as ones that comprise a substrate with a layer of hyperbranched polymer or mixtures containing the hyperbranched polymer disposed on the substrate.

The hyperbranched polymers are discussed in detail above. Examples of articles that comprise the hyperbranched polymer by itself, include ones in which the hyperbranched polymer is formed into a shape. A wide variety of shapes are possible including essentially flat articles such as sheets, films, and webs, including nonwoven webs and melt blown webs. The articles may also be three dimensional, such as a foam or shaped article. Three dimensional shapes can be prepared using molds or by three dimensional printing processes.

A wide range of articles that comprise the hyperbranched polymer and at least one additive are encompassed by this disclosure. One class of articles that is particularly suitably prepared from the hyperbranched polymer is adhesive articles. These adhesive articles can be pressure sensitive adhesives or heat activatable adhesives. Typically the adhesive articles comprise the hyperbranched polymer and a silicone tackifying resin or a silicone fluid or gum. In some embodiments, when silicone tackifying resins are not used, the hyperbranched polymer may be used as a hot melt adhesive. Hot melt adhesives are well understood in the adhesive arts as being a separate class of materials from heat activated adhesives, and hot melt adhesives are ones that are thermoplastic adhesive that are applied in a molten state and forms a bond upon cooling to a solid state.

Silicone tackifying resins are widely used in the siloxane art to produce adhesive compositions. These tackifying resins were formerly referred to as "silicate" tackifying resins. The silicone tackifying resin can influence the physical properties of the resulting adhesive composition. For example, as silicone tackifying resin content is increased, the glassy to rubbery transition of the adhesive composition occurs at increasingly higher temperatures. In some exemplary adhesive compositions, a plurality of silicone tackifying resins can be used to achieve desired performance.

Suitable silicone tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicone resins include MQ silicone tackifying resins, MQD silicone tackifying resins, and MQT silicone tackifying resins. These silicone tackifying resins usually have a number average molecular weight in the range of 100 to 50,000 or in the range of 500 to 15,000 and generally have methyl R' groups.

MQ silicone tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicone tackifying resin. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2=CH-$) groups ("$D^{Vi}$" units).

MQT silicone tackifying resins are terpolymers having R'$_3$SiO$_{1/2}$ units, SiO$_{4/2}$ units and R'SiO$_{3/2}$ units ("T" units) such as are taught in U.S. Pat. No. 5,110,890 (Butler) and Japanese Kokai HE 2-36234.

Suitable silicone tackifying resins are commercially available from sources such as Dow Corning, Midland, Mich., Momentive Performance Materials, Waterford, N.Y. and Bluestar Silicones, Rock Hill, S.C. Examples of particularly useful MQ silicone tackifying resins include those available under the trade designations SR-545 and SR-1000, both of which are commercially available from Momentive Performance Materials, Waterford, N.Y. Such resins are generally supplied in organic solvent and may be employed in the formulations of the adhesives of the present disclosure as received. Blends of two or more silicone resins can be included in the adhesive compositions.

The blend compositions comprise a relatively large amount of silicone tackifying resin. The blend compositions comprise at least 30% by weight silicone tackifying resin, 40% by weight or even 50% by weight or more. The terms "% by weight" and "weight %" are used interchangeably and refer to the percentage of the total solid content of the composition.

The blend compositions may also comprise a silicone fluid or silicone gum. Silicone fluids and gums are distinguished by the viscosities, with silicone gums being highly viscous. In some embodiments, combinations of hyperbranched polymers and silicone gums are used to prepare adhesive compositions. Typically the silicone gums have a high viscosity such as 1,000,000 centipoise.

In some embodiments the article is a blend of one or more polymeric components together with the hyperbranched polymer. A wide variety of polymers are suitable including thermoplastics, elastomers, and the like. In some embodiments, the hyperbranched polymer is the major component, meaning that it is present in amounts greater than 50% by weight. In other blend or mixture embodiments, the hyperbranched polymer is a minor component (that is to say it is present in less than 50% by weight). Typically these embodiments involve one or more polymeric materials with the hyperbranched polymer functioning as a processing aid. Processing aids are designed to improve the melt processability and handling of high molecular weight polymers.

The blend composition, besides the hyperbranched polymer and the at least one other polymeric component, can contain additional additives if desired. A wide range of additional additives can be added in any desired quantity as long as they do not interfere with the desired properties of the blend composition. Examples of suitable additives include UV stabilizers, antioxidants, antimicrobials, fillers, hydratable salts such as anhydrous sulfate salts of sodium, calcium, and magnesium, UV sensitizers, enzymes, and oils (both silicone oils and non-silicone oils).

Another common use for silicones are cosmetic and personal care formulations. Among the uses are shampoos, foundation, lip gloss, sunscreen, moisturizers, antiperspirants, eye shadow, and the like. Frequently, blends of silicones may be used and these blends may include silicone tackifying resins. The hyperbranched polymers and compositions containing the hyperbranched polymers of this disclosure can be used in a wide range of personal care compositions.

Another class of articles are those which comprise a substrate with a first major surface and a second major surface, wherein the hyperbranched polymer or a composition that includes the hyperbranched polymer is coated on at least a portion of the first major surface of the substrate. A wide range of substrates are suitable for use in these articles. The substrate may be rigid, semi-rigid, or flexible. Examples of rigid substrates include glass plates, relatively thick polymeric plates such as plates of polycarbonate (PC) or polymethylmethacrylate (PMMA), ceramics, metal plates, or the external surface of device. Examples of semi-rigid substrates include relatively thick polymeric films (either monolithic films or multilayer films), thick metal foils, and the like. Examples of flexible substrates include tape backings, films (including both optical films and non-optical films), and release liners.

A particularly suitable class of substrates are optical films because, as mentioned above, the hyperbranched polymers are typically optically transparent. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, infrared reflective films, ultraviolet reflective films, brightness enhancement films, reflective polarizer films such as dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.); and U.S. Pat. No. 5,360,659 (Arends et al.).

In other embodiments, the substrate is a tape backing. The tape backing may be opaque or translucent or can come in a variety of different colors, it may be stretchable or relatively non-stretchable, and may be porous or nonporous. The tape backing may include a wide variety of forms including paper sheets, natural or synthetic fiber webs, and films comprising nylon, polyesters, polyacetates, polyacrylics, ethylene-propylene-diene rubbers, natural rubber, polyesters, polyisobutylenes, polyolefins (e.g., polypropylene polyethylene, ethylene propylene copolymers, and ethylene butylene copolymers), polyurethanes (including polyurethane foams), vinyls including polyvinylchloride and ethylene-vinyl acetate, polyamides, polystyrenes, fiberglass, ceramic fibers, and/or combinations thereof.

The disclosure includes the following embodiments:

Among the embodiments are hyperbranched polymers. Embodiment 1 is a hyperbranched polymer prepared from the reaction mixture comprising: AX$_g$ and BZ$_m$ wherein each X comprises either an oxalylamino-functional group of the formula:

—NH—(CO)—(CO)—OR$^2$, wherein each R$^2$ is independently an alkyl, haloalkyl, aryl, or aryl substituted with an alkyl, alkoxy, halo, or alkoxycarbonyl; and —(CO) is a carbonyl group —C=O; or an amino-functional group of the formula:

—NHR³, wherein R³ is an H, an alkyl, or aryl group; A comprises either a group with the formula:
W(—[—OSi(R¹)$_2$—]$_n$—O—Si(R¹)$_2$—Y—)$_g$ wherein W is a single bond or a g-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and g is an integer of 2 or greater; or
a g-valent alkylene, arylene, heteroalkylene, or heteroarylene group; where g is an integer of 2 or greater;
B comprises either an m-valent alkylene, arylene, heteroalkylene, or heteroarylene group; or
a group with the formula:
W(—[—OSi(R¹)$_2$—]$_n$—O—Si(R¹)$_2$—Y—)$_m$ wherein W is an m-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and m is an integer of 3 or greater;
each Z comprises either an amino-functional group of the formula:
—NR³H wherein R³ is an H, an alkyl, or aryl group; or
an oxalylamino-functional group of the formula:
—NH—(CO)—(CO)—OR², wherein each R² is independently an alkyl, haloalkyl, aryl, or aryl substituted with an alkyl, alkoxy, halo, or alkoxycarbonyl; —(CO) is a carbonyl group —C=O; and
m is an integer of 3 or greater; such that X and Z form a reactive combination of oxalylamino-functional and amino-functional groups.

Embodiment 2 is the hyperbranched polymer of embodiment 1, wherein AX$_g$ comprises a molecule of Formula I:

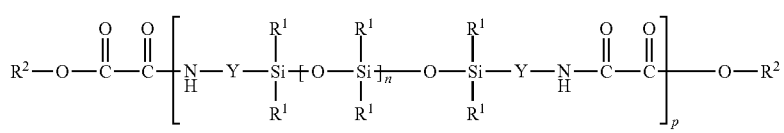

Formula I wherein each R¹ is independently an alkyl, haloalkyl, aralkyl, alkenyl, aryl, or aryl substituted with an alkyl, alkoxy, or halo; each R² is independently an alkyl, haloalkyl, aryl, or aryl substituted with an alkyl, alkoxy, halo, or alkoxycarbonyl; each Y is independently an alkylene, aralkylene, or a combination thereof; the subscript n is independently an integer of 0 to 1500; and the subscript p is an integer of 1 to 10; and BZ$_m$, comprises a molecule wherein B comprises an m-valent alkylene, arylene, heteroalkylene, or heteroarylene group; Z comprises an amine group of the type —NR³H where R³ is an H, an alkyl, or aryl group; m is an integer of 3 or greater.

Embodiment 3 is the hyperbranched polymer of embodiment 1 or 2, wherein each R¹ is methyl.

Embodiment 4 is the hyperbranched polymer of embodiment 1 or 2, wherein at least 50 percent of the R¹ groups are methyl.

Embodiment 5 is the hyperbranched polymer of any of embodiments 1-4, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 6 is the hyperbranched polymer of any of embodiments 1-5, wherein Y is an alkylene having 1 to 4 carbon atoms.

Embodiment 7 is the hyperbranched polymer of any of embodiments 1-6, wherein p is at least 2.

Embodiment 8 is the hyperbranched polymer of any of embodiments 1-7, wherein n is at least 40.

Embodiment 9 is the hyperbranched polymer of any of embodiments 1-8, wherein B comprises an m-valent alkylene, or heteroalkylene, group; Z comprises an amine group of the type —NR³H where R³ is an H; and m is an integer of 3.

Embodiment 10 is the hyperbranched polymer of any of embodiments 1-8, wherein m is an integer greater than 3.

Embodiment 11 is the hyperbranched polymer of any of embodiments 1-10, wherein the reaction mixtures comprises a molar excess of Z$_m$ groups relative to X$_g$ groups.

Embodiment 12 is the hyperbranched polymer of embodiment 1, wherein AX$_g$ comprises a group wherein: A comprises a g-valent alkylene, arylene, heteroalkylene, or heteroarylene group; and each X comprises an oxalylamino-functional group of the formula:
—NH—(CO)—(CO)—OR², wherein each R² is independently an alkyl, haloalkyl, aryl, or aryl substituted with an alkyl, alkoxy, halo, or alkoxycarbonyl; and —(CO) is a carbonyl group —C=O; where g is an integer of 2 or greater; and B comprises an m-valent group with the formula:
W(—[—OSi(R¹)$_2$—]$_n$—O—Si(R¹)$_2$—Y—)$_m$ wherein W is a an m-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and each Z comprises a —NR³H group; where R³ is an H, an alkyl, or aryl group; and m is an integer of 3 or greater.

Embodiment 13 is the hyperbranched polymer of embodiment 12, wherein each R¹ is methyl.

Embodiment 14 is the hyperbranched polymer of embodiment 12, wherein at least 50 percent of the R¹ groups are methyl.

Embodiment 15 is the hyperbranched polymer of any of embodiments 12-14, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 16 is the hyperbranched polymer of any of embodiments 12-15, wherein Y is an alkylene having 1 to 4 carbon atoms.

Embodiment 17 is the hyperbranched polymer of any of embodiments 12-16, wherein n is at least 40.

Embodiment 18 is the hyperbranched polymer of any of embodiments 12-17, wherein A comprises an g-valent alkylene, or heteroalkylene, group; and g is an integer of 2.

Embodiment 19 is the hyperbranched polymer of any of embodiments 12-18, wherein m is an integer of 3.

Embodiment 20 is the hyperbranched polymer of any of embodiments 12-18, wherein m is an integer greater than 3.

Embodiment 21 is the hyperbranched polymer of any of embodiments 12-20, wherein the reaction mixtures comprises a molar excess of $Z_m$ groups relative to $X_g$ groups.

Embodiment 22 is the hyperbranched polymer of embodiment 1, wherein the $AX_g$ compound comprises a polydiorganosiloxane diamine of Formula II:

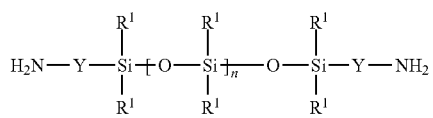

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and the subscript n is independently an integer of 0 to 1500; and B comprises an m-valent alkylene, arylene, heteroalkylene, or heteroarylene group; and each Z comprises an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; and —(CO) is a carbonyl group —C=O; and wherein m is an integer of 3 or greater.

Embodiment 23 is the hyperbranched polymer of embodiment 22, wherein each $R^1$ is methyl.

Embodiment 24 is the hyperbranched polymer of embodiment 22, wherein at least 50 percent of the $R^1$ groups are methyl.

Embodiment 25 is the hyperbranched polymer of any of embodiments 22-24, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 26 is the hyperbranched polymer of any of embodiments 22-25, wherein Y is an alkylene having 1 to 4 carbon atoms.

Embodiment 27 is the hyperbranched polymer of any of embodiments 22-26, wherein n is at least 40.

Embodiment 28 is the hyperbranched polymer of any of embodiments 22-27, wherein m is an integer of 3.

Embodiment 29 is the hyperbranched polymer of any of embodiments 22-27, wherein m is an integer greater than 3.

Embodiment 30 is the hyperbranched polymer of any of embodiments 22-29, wherein the reaction mixtures comprises a molar excess of $Z_m$ groups relative to $X_g$ groups.

Also disclosed are methods of forming hyperbranched polymers. Embodiment 31 is the method of forming a hyperbranched polymer comprising: providing a composition with compounds of the general Formula $AX_g$ wherein each X comprises either an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; and —(CO) is a carbonyl group —C=O; or an amino-functional group of the formula:

—$NHR^3$, wherein $R^3$ is an H, an alkyl, or aryl group; A comprises either a group with the formula:

W(—[—$OSi(R^1)_2$—]$_n$—O—$Si(R^1)_2$—Y—)$_g$ wherein W is a single bond or a g-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and g is an integer of 2 or greater; or a g-valent alkylene, arylene, heteroalkylene, or heteroarylene group; where g is an integer of 2 or greater; providing a composition with compounds of the general Formula $BZ_m$ wherein B comprises either an m-valent alkylene, arylene, heteroalkylene, or heteroarylene group; or a group with the formula:

W(—[—$OSi(R^1)_2$—]$_n$—O—$Si(R^1)_2$—Y—)$_m$ wherein W is an m-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and m is an integer of 3 or greater; each Z comprises either an amino-functional group of the formula:

—$NR^3H$ where $R^3$ is an H, an alkyl, or aryl group; or an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; —(CO) is a carbonyl group —C=O; and m is an integer of 3 or greater; such that X and Z form a reactive combination of oxalylamino-functional and amino-functional groups; and mixing the compounds of $AX_g$ with the compounds of $BZ_m$, at room temperature to generate a hyperbranched polydiorganosiloxane polyoxamide polymer.

Embodiment 32 is the method of embodiment 31, wherein $AX_g$ comprises a molecule of Formula I:

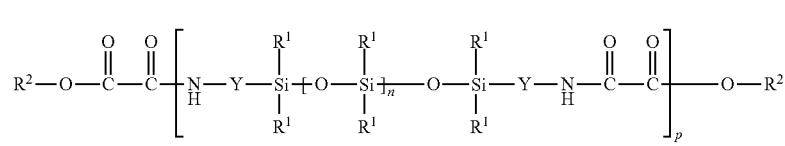

Formula I wherein each $R^1$ is independently an alkyl, haloalkyl, aralkyl, alkenyl, aryl, or aryl substituted with an alkyl, alkoxy, or halo; each $R^2$ is independently an alkyl, haloalkyl, aryl, or aryl substituted with an alkyl, alkoxy, halo, or alkoxycarbonyl; each Y is independently an alkylene, aralkylene, or a combination thereof; the subscript n is independently an integer of 0 to 1500; and the subscript p is an integer of 1 to 10; and $BZ_m$, comprises a molecule wherein B comprises an m-valent alkylene, arylene, heteroalkylene, or heteroarylene group; Z comprises an amine group of the type —$NR^3H$ where $R^3$ is an H, an alkyl, or aryl group; m is an integer of 3 or greater.

Embodiment 33 is the method of embodiment 31 or 32, wherein each $R^1$ is methyl.

Embodiment 34 is the method of embodiment 31 or 32, wherein at least 50 percent of the $R^1$ groups are methyl.

Embodiment 35 is the method of any of embodiments 31-34, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 36 is the method of any of embodiments 31-35, wherein Y is an alkylene having 1 to 4 carbon atoms.

Embodiment 37 is the method of any of embodiments 31-36, wherein p is at least 2.

Embodiment 38 is the method of any of embodiments 31-37, wherein n is at least 40.

Embodiment 39 is the method of any of embodiments 31-38, wherein B comprises an m-valent alkylene, or heteroalkylene, group; Z comprises an amine group of the type —$NR^3H$ where $R^3$ is an H; and m is an integer of 3.

Embodiment 40 is the method of any of embodiments 31-38, wherein m is an integer greater than 3.

Embodiment 41 is the method of any of embodiments 31-40, wherein the reaction mixtures comprises a molar excess of $Z_m$ groups relative to $X_g$ groups.

Embodiment 42 is the method of embodiment 31, wherein $AX_g$ comprises a group wherein: A comprises a g-valent alkylene, arylene, heteroalkylene, or heteroarylene group; and each X comprises an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; and —(CO) is a carbonyl group —C=O; where g is an integer of 2 or greater; and B comprises an m-valent group with the formula:
W(—[—$OSi(R^1)_2$—]$_n$—O—$Si(R^1)_2$—Y—)$_m$ wherein W is a an m-valent alkylene, arylene, heteroalkylene, or heteroarylene group; each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and each Z comprises a —$NR^3H$ group; where $R^3$ is an H, an alkyl, or aryl group; and m is an integer of 3 or greater.

Embodiment 43 is the method of embodiment 42, wherein each $R^1$ is methyl.

Embodiment 44 is the method of embodiment 42, wherein at least 50 percent of the $R^1$ groups are methyl.

Embodiment 45 is the method of any of embodiments 42-44, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 46 is the method of any of embodiments 42-45, wherein Y is an alkylene having 1 to 4 carbon atoms.

Embodiment 47 is the method of any of embodiments 42-46, wherein n is at least 40.

Embodiment 48 is the method of any of embodiments 42-47, wherein A comprises an g-valent alkylene, or heteroalkylene, group; and g is an integer of 2.

Embodiment 49 is the method of any of embodiments 42-48, wherein m is an integer of 3.

Embodiment 50 is the method of any of embodiments 42-48, wherein m is an integer greater than 3.

Embodiment 51 is the method of any of embodiments 42-50, wherein the reaction mixtures comprises a molar excess of $Z_m$ groups relative to $X_g$ groups.

Embodiment 52 is the method of embodiment 31, wherein the $AX_g$ compound comprises a polydiorganosiloxane diamine of Formula II:

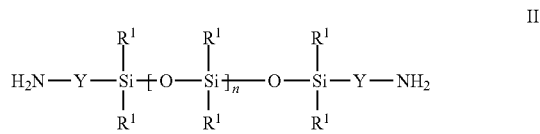

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and the subscript n is independently an integer of 0 to 1500; and B comprises an m-valent alkylene, arylene, heteroalkylene, or heteroarylene group; and each Z comprises an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; and —(CO) is a carbonyl group —C=O; and wherein m is an integer of 3 or greater.

Embodiment 53 is the method of embodiment 52, wherein each $R^1$ is methyl.

Embodiment 54 is the method of embodiment 52, wherein at least 50 percent of the $R^1$ groups are methyl.

Embodiment 55 is the method of any of embodiments 52-54, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 56 is the method of any of embodiments 52-55, wherein Y is an alkylene having 1 to 4 carbon atoms.

Embodiment 57 is the method of any of embodiments 52-56, wherein n is at least 40.

Embodiment 58 is the method of any of embodiments 52-57, wherein m is an integer of 3.

Embodiment 59 is the method of any of embodiments 52-57, wherein m is an integer greater than 3.

Embodiment 60 is the method of any of embodiments 52-59, wherein the reaction mixtures comprises a molar excess of $Z_m$ groups relative to $X_g$ groups.

Also disclosed are articles. Embodiment 61 is an article comprising a hyperbranched polydiorganosiloxane polyoxamide polymer, wherein the hyperbranched polymer is prepared from the reaction mixture comprising:
$AX_g$ and $BZ_m$
wherein each X comprises either an oxalylamino-functional group of the formula:
—NH—(CO)—(CO)—$OR^2$, wherein each $R^2$ is independently an alkyl, haloalkyl, aryl, or aryl substituted with an alkyl, alkoxy, halo, or alkoxycarbonyl; and —(CO) is a carbonyl group —C=O; or an amino-functional group of the formula:

—NHR³, wherein R³ is an H, an alkyl, or aryl group; A comprises either a group with the formula:
W(—[—OSi(R¹)₂—]ₙ—O—Si(R¹)₂—Y—)_g wherein W is a single bond or a g-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and g is an integer of 2 or greater; or a g-valent alkylene, arylene, heteroalkylene, or heteroarylene group; where g is an integer of 2 or greater; B comprises either an m-valent alkylene, arylene, heteroalkylene, or heteroarylene group; or a group with the formula:
W(—[—OSi(R¹)₂—]ₙ—O—Si(R¹)₂—Y—)_m wherein W is an m-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and m is an integer of 3 or greater; each Z comprises either an amino-functional group of the formula:
—NR³H wherein R³ is an H, an alkyl, or aryl group; or an oxalylamino-functional group of the formula:
—NH—(CO)—(CO)—OR², wherein each R² is independently an alkyl, haloalkyl, aryl, or aryl substituted with an alkyl, alkoxy, halo, or alkoxycarbonyl; —(CO) is a carbonyl group —C=O; and
m is an integer of 3 or greater; such that X and Z form a reactive combination of oxalylamino-functional and amino-functional groups.

Embodiment 62 is the article of embodiment 61, wherein $AX_g$ comprises a molecule of Formula I:

Embodiment 67 is the article of any of embodiments 61-66, wherein p is at least 2.

Embodiment 68 is the article of any of embodiments 61-67, wherein n is at least 40.

Embodiment 69 is the article of any of embodiments 61-68, wherein B comprises an m-valent alkylene, or heteroalkylene, group; Z comprises an amine group of the type —NR³H where R³ is an H; and m is an integer of 3.

Embodiment 70 is the article of any of embodiments 61-68, wherein m is an integer greater than 3.

Embodiment 71 is the article of any of embodiments 61-70, wherein the reaction mixtures comprises a molar excess of $Z_m$ groups relative to $X_g$ groups.

Embodiment 72 is the article of embodiment 61, wherein $AX_g$ comprises a group wherein: A comprises a g-valent alkylene, arylene, heteroalkylene, or heteroarylene group; and each X comprises an oxalylamino-functional group of the formula:
—NH—(CO)—(CO)—OR², wherein each R² is independently an alkyl, haloalkyl, aryl, or aryl substituted with an alkyl, alkoxy, halo, or alkoxycarbonyl; and —(CO) is a carbonyl group —C=O; where g is an integer of 2 or greater; and B comprises an m-valent group with the formula:
W(—[—OSi(R¹)₂—]ₙ—O—Si(R¹)₂—Y—)_m wherein W is a an m-valent alkylene, arylene, heteroalkylene, or heteroarylene group; each R¹ is independently an alkyl, haloalkyl, aralkyl, alkenyl, aryl, or aryl substituted with an alkyl, alkoxy, or halo; each Y is independently an alkylene, aralkylene, or a combination thereof; and each subscript n is independently an integer of 0 to 1500; and each Z comprises a —NR³H group; where R³ is an H, an alkyl, or aryl group; and m is an integer of 3 or greater.

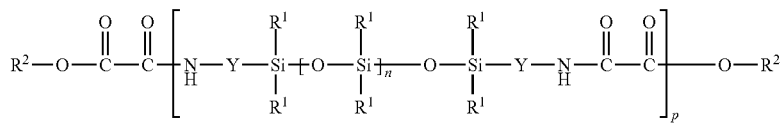

Formula I wherein each R¹ is independently an alkyl, haloalkyl, aralkyl, alkenyl, aryl, or aryl substituted with an alkyl, alkoxy, or halo; each R² is independently an alkyl, haloalkyl, aryl, or aryl substituted with an alkyl, alkoxy, halo, or alkoxycarbonyl; each Y is independently an alkylene, aralkylene, or a combination thereof; the subscript n is independently an integer of 0 to 1500; and the subscript p is an integer of 1 to 10; and $BZ_m$, comprises a molecule wherein B comprises an m-valent alkylene, arylene, heteroalkylene, or heteroarylene group; Z comprises an amine group of the type —NR³H where R³ is an H, an alkyl, or aryl group; m is an integer of 3 or greater.

Embodiment 63 is the article of embodiment 61 or 62, wherein each R¹ is methyl.

Embodiment 64 is the article of embodiment 61 or 62, wherein at least 50 percent of the R¹ groups are methyl.

Embodiment 65 is the article of any of embodiments 61-64, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 66 is the article of any of embodiments 61-65, wherein Y is an alkylene having 1 to 4 carbon atoms.

Embodiment 73 is the article of embodiment 72, wherein each R¹ is methyl.

Embodiment 74 is the article of embodiment 72, wherein at least 50 percent of the R¹ groups are methyl.

Embodiment 75 is the article of any of embodiments 72-74, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 76 is the article of any of embodiments 72-75, wherein Y is an alkylene having 1 to 4 carbon atoms.

Embodiment 77 is the article of any of embodiments 72-76, wherein n is at least 40.

Embodiment 78 is the article of any of embodiments 72-77, wherein A comprises an g-valent alkylene, or heteroalkylene, group; and g is an integer of 2.

Embodiment 79 is the article of any of embodiments 72-78, wherein m is an integer of 3.

Embodiment 80 is the article of any of embodiments 72-78, wherein m is an integer greater than 3.

Embodiment 81 is the article of any of embodiments 72-80, wherein the reaction mixtures comprises a molar excess of $Z_m$ groups relative to $X_g$ groups.

Embodiment 82 is the article of embodiment 61, wherein the $AX_g$ compound comprises a polydiorganosiloxane diamine of Formula II:

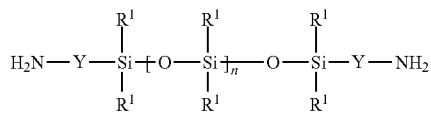

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and the subscript n is independently an integer of 0 to 1500; and B comprises an m-valent alkylene, arylene, heteroalkylene, or heteroarylene group; and each Z comprises an oxalylamino-functional group of the formula:
—NH—(CO)—(CO)—OR², wherein each $R^2$ is independently an alkyl, haloalkyl, aryl, or aryl substituted with an alkyl, alkoxy, halo, or alkoxycarbonyl; and —(CO) is a carbonyl group —C=O; and wherein m is an integer of 3 or greater.

Embodiment 83 is the article of embodiment 82, wherein each $R^1$ is methyl.

Embodiment 84 is the article of embodiment 82, wherein at least 50 percent of the $R^1$ groups are methyl.

Embodiment 85 is the article of any of embodiments 82-84, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

Embodiment 86 is the article of any of embodiments 82-85, wherein Y is an alkylene having 1 to 4 carbon atoms.

Embodiment 87 is the article of any of embodiments 82-86, wherein n is at least 40.

Embodiment 88 is the article of any of embodiments 82-87, wherein m is an integer of 3.

Embodiment 89 is the article of any of embodiments 82-87, wherein m is an integer greater than 3.

Embodiment 90 is the article of any of embodiments 61-89, further comprising at least one additive.

Embodiment 91 is the article of embodiment 90, wherein the at least one additive comprises a silicone tackifying resin, and the article comprises an adhesive article.

Embodiment 92 is the article of embodiment 91, wherein the silicone tackifying resin comprises an MQ tackifying resin.

Embodiment 93 is the article of any of embodiments 90-91, wherein the adhesive article comprises a pressure sensitive adhesive article.

Embodiment 94 is the article of any of embodiments 90-91, wherein the adhesive article comprises a heat activated adhesive article.

Embodiment 95 is the article of embodiment 90, wherein the at least one additive comprises at least one additional polymer, and the article comprises a polymer blend.

Embodiment 96 is the article of embodiment 95, wherein the polymer blend comprises a majority of the at least one additional polymer.

Embodiment 97 is the article of embodiment 95 or 96, wherein the at least one additional polymer comprises an elastomeric polymer, a thermoplastic polymer, or a thermoplastic elastomer polymer.

Embodiment 98 is the article of any of embodiments 61-97, further comprising a substrate with a first major surface and a second major surface, wherein the hyperbranched polydiorganosiloxane polyoxamide copolymer composition is coated on at least a portion of the first major surface of the substrate.

Embodiment 99 is the article of any of embodiments 61-98, wherein the article comprises a film, a foam, or web, wherein the web comprises a melt blown web or a nonwoven web.

Embodiment 100 is the article of any of embodiments 90-99, wherein the at least one additive comprises a UV stabilizer, an antioxidant, an antimicrobial, a filler, a hydratable salt, a UV sensitizer, an enzymes, a silicone oil, or a non-silicone oil.

Embodiment 101 is the article of any of embodiments 61-90, wherein the article does not comprise silicone tackifying resin and the article comprises a hot melt adhesive.

EXAMPLES

Hyperbranched siloxane polyoxamides in solution and film article examples were prepared and tested. Results show different and unanticipated rheological properties as compared to linear siloxane polyoxamides.

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: in =inch; mm=millimeters; cm=centimeters; min=minutes; hr=hours; mL=milliliters; oz=ounces; N/dm=Newton per decimeter; g=gram; mg=milligrams; kg=kilogram; K=1,000 (ie 15K=15,000 Daltons molecular weight); psi=pounds per square inch; MHz=megaHertz. The terms wt %, and % by weight are used interchangeably.

TABLE

| Abbreviation | Description |
|---|---|
| PDMS-OF | Polydimethylsiloxane Oxalate fluid, 15K, available as EOx 200 D from Wacker Chemie AG, (München, Germany) |
| TAEA | Tris(2-aminoethyl)amine, commercially available from Aldrich Chemical, St. Louis, MO |
| POS Pellet | Polyoxamide-silicone pellet (15K) available as TPSE B from Wacker Chemie AG, (München, Germany) |
| ST Resin | Silicone tackifying resin of MQ resin, commercially available as a 60 wt % solids solution in toluene, commercially available as SILGRIP SR545 from Momentive, Waterford, NY |
| PDMS gum | Polydimethyl siloxane fluid, commercially available as AK100000 from Wacker Chemie AG, (München, Germany) |
| THF | Tetrahydrofuran solvent, commercially available from Aldrich Chemical, St. Louis, MO |
| IPA | Iso-propyl alcohol solvent, commercially available from Aldrich Chemical, St. Louis, MO |
| PET Film | Film of polyethylene terephthalate |

Test Methods
Nuclear Magnetic Resonance (NMR)

Samples (8-40 mg) were analyzed as solutions in deuterated tetrahydrofuran (THF, 700-800 microliters). One dimensional (1D) proton and ¹³C NMR data were collected for the submitted samples using a Bruker Avance 600 MHz NMR spectrometer (Billerica, Mass.) equipped with a cryogenically cooled probe head. Homo- and hetero-nuclear, two-dimensional (2D) NMR data were also collected to confirm the spectral assignments. One of the residual proto-solvent resonances was used as a secondary chemical shift reference in the proton dimension ($\delta$=1.73), while one of the deutero-solvent resonances was used as a secondary chemical shift reference in the 13C dimension ($\delta$=25.37 ppm). All the NMR data were collected with the sample held at 25° C. Results are reported in ppm.

Gel Permeation Chromatography (GPC)

For each sample a series of concentrations was prepared by weighing the sample in the range 0.5 to 30 (mg/mL) directly into glass volumetric flasks (10 or 25 mL) and adding toluene to the mark. The sample solutions were swirled for at least 16 hours. The solutions were filtered through 0.2 or 0.45 micrometer PTFE (polytetrafluoro ethylene) syringe filters and injected directly into a DAWN HELEOS II multi-angle static light scattering detector from Wyatt Technology Corporation (Goleta, Calif.). The order of injection was a solvent blank followed by the samples in increasing order of concentration followed by a second solvent blank. The light scattering signal was allowed to stabilize before the next injection. The data were collected and analyzed using ASTRA 6 software from Wyatt Technology Corporation, as per the Zimm plot formalism (see reference). Results are reported in Daltons (g/mol).

REFERENCE

[1] Podzimek, Stepan. Light Scattering, Size Exclusion Chromatography and Asymmetric Flow Field Flow Fractionation: Powerful Tools for the Characterization of Polymers, Proteins and Nanoparticles. John Wiley & Sons, Inc.: Hoboken, N.J., 2011. pp 84-93.

Thermogravimetric Analysis (TGA)

Samples (10 mg±0.5 mg) were analyzed using the TA Instruments Discovery Thermogravimetric Analyzer (TGA). The sample was subjected to a heating profile ranging from room temperature (~25° C.) to 700° C. in a nitrogen atmosphere, with a linear heating rate of 20.0° C./min and a Hi-Res resolution setting of 4.0. Results are reported in wt % of sample and degrees C.

Dynamic Scanning Calorimetry (DSC)

The samples were prepared for thermal analysis by weighing and loading the material into TA Instruments aluminum DSC sample pans. The specimens were analyzed using the TA Instruments Discovery Differential Scanning Calorimeter (DSC—SN DSC1-0091) utilizing a heat-cool-heat method in standard mode (−155 to ~50° C. at 10° C./min.). After data collection, the thermal transitions were analyzed using the TA Universal Analysis program. The glass transition temperatures were evaluated using the step change in the standard heat flow (HF) curves. The midpoint (half height) temperature of the second heat transition is quoted. Results are reported in degrees C.

Head Space Gas Chromatography Mass Spectroscopy (HS-GCMS)

Head space GCMS was performed using an Agilent G1888 headspace autosampler, an HP6890 GC and a 5973 MSD, and EI mass spectrometry 70 eV scan 14-550 Da detection following a standard procedure (sample mass 20 mg, vial size 20 mL, oven temperature 85° C., vial pressure 16 psi). Areas under peaks were measured on a plot of relative abundances in total ion signal vs. retention time Transmission, Haze, Clarity, and b* Measurements The measurement of average % transmission, haze and clarity were conducted with a haze meter (BYK Gardiner, under the trade designation "BYK HAZEGARD Plus, Columbia, Md.") based on ASTM D1003-11.

Refractive Index Measurements

Refractive index of samples was measured using a Bausch and Lomb refractometer (ABBE 31, Bridgewater, N.J., USA) (white light) at room temperature. Following machine instructions.

180° Peel Adhesion

Each sample was given 24 hours to equilibrate to room temperature. Using only a glass substrate, unless otherwise noted, adhesive coatings (50-120 micrometers) on polyester film were cut into approx. 1 inch×10 inch (2.54×24.4 cm) strips. Each strip was then adhered to an 8×12 inch (20×30.5 cm) clean, solvent washed, glass plate using a 2-kilogram roller passed once over the strip. The bonded assembly dwelled at room temperature for 1 hour, and was tested for 180° peel adhesion using an IMASS slip/peel tester (Model 3M90, Instrumentors Inc., Strongsville, Ohio) at a rate of 2.3 meters/minute (90 inches/minute) over a 5 second data collection time. Duplicate samples were tested; the reported peel adhesion value was the mean of data gathered from each individual peel test. Peel adhesion values were recorded in oz/inch or g/inch, and converted to N/dm.

Shear Strength

Each sample was given 24 hours to equilibrate to room temperature. Unless otherwise noted, adhesive coatings (50-120 micrometers) on polyester film were cut into 1.27 cm (0.5 inch) by 7.5 cm (3 inch) strips. Each strip was then adhered to a stainless-steel panel such that a 1.27×1.27 cm portion of each strip was in firm contact with the panel, with one end portion of the tape being free. The panel with a coated strip attached was held in a rack such that the panel formed an angle of 178 degrees with the extended tape free end, which was tensioned by application of a force of 1 kg applied as a hanging weight from the free end of the coated strip. The 178 degrees was used to negate any peel forces, thus ensuring that only shear strength forces were measured, in order to determine the holding power of the tape being tested. The time elapsed (minutes) for each tape example to separate from the test panel was recorded as the shear strength. All shear strength failures (if the adhesive failed at less than 10,000 minutes) reported herein were cohesive failures or adhesive failures.

Rheology

Rheological characterization of samples was carried out using TA Instruments (New Castle, Del.) AR-G2, 20 mm parallel mode, and temperature from 10 to 100° C. at 1 Hz.

Example 1: Synthesis of Hyperbranched Polymer HBP1

A mixture of PDMS-OF, 15 k (12.8 g, 1.98 mmol NHCOCO-OEt groups) and TAEA (0.28 g, 5.81 mmol $NH_2$ amine groups, 3-fold molar excess) and THF (7 mL, ~33 wt % THF) was stirred at 50° C. for 7 days under nitrogen. The soft white solid was washed with methanol (3×10 mL) to remove tris(2-aminoethyl)amine. The product showed complete solubility in toluene-IPA. The product was characterized by $^1$H NMR, GPC, TGA and DSC. $^1$H NMR ($d_8$-THF, $\delta$) 2.75 (N($CH_2$—$CH_2$NHCO)$_3$ trisubstituted TAEA unit) 7.62 (N($CH_2$—$CH_2$NHCO)$_3$ trisubstituted TAEA unit). GPC (toluene, LS, Zimm plot), Mw=71,300. TGA (20° C. min$^{-1}$, $N_2$): 5% mass loss at 367° C. DSC (10° C. min-1, $N_2$): −126° C. ($T_g$). Headspace GCMS (85° C./20 min equilibration) showed no evidence of tris(2-aminoethyl) amine in the product. Refractive index 1.406.

Example 2: Synthesis of Hyperbranched Polymer HBP2

A mixture of PDMS-OF, 15 k (12.8 g, 1.98 mmol NHCOCO-OEt groups) and TAEA (0.28 g, 5.81 mmol $NH_2$ amine groups, 3-fold molar excess) was stirred at 70° C. for 10 days under nitrogen. The soft white solid was washed with methanol (3×10 mL) to remove tris(2-aminoethyl) amine. Headspace GCMS (85° C./20 min equilibration) showed no evidence of tris(2-aminoethyl)amine in the product. The product showed complete solubility in toluene-IPA. The product was characterized by $^1H$ NMR, GPC, TGA and DSC. $^1H$ NMR ($d_8$-THF, δ) 2.75 ($N(CH_2—CH_2NHCO)_3$ trisubstituted TAEA unit) 7.62 ($N(CH_2—CH_2NHCO)_3$ tri-substituted TAEA unit). GPC (toluene, LS, Zimm plot), Mw=106,000. TGA (20° C. $min^{-1}$, $N_2$): 5% mass loss at 386° C. DSC (10° C. min-1, $N_2$): −126° C. ($T_g$).

Formulation and Preparation of Test Samples

The components of the formulations were mixed in toluene-isopropanol at 50 wt % solids, and mixed using a roller mixer for 2 hr until the solutions were homogeneous as described in Table 1 below. Comparative Examples (labeled CE) as well as Examples (labeled E) were prepared. Samples were coated onto PET Film using an adjustable notch bar. Test samples were heated in an oven at 80° C. for 20 minutes to remove the solvent, and a release liner (LOPAREX 5199 liner) was laminated on top of the adhesive layer. Adhesive layer thicknesses were in the 50-120 micrometer range. Samples were tested per the Tests Methods and reported in Tables 2-6.

TABLE 1

Example Formulations

| Example | Components |
|---|---|
| CE1 | 100% POS |
| E1a | 100% HBP1 |
| CE2 | 60% POS, 40% SR545 |
| CE3 | 50% POS, 50% ST Resin |
| CE4 | 40% POS, 60% ST Resin |
| CE5 | 50% POS, 50% PDMS gum |
| CE6 | 60% POS, 40% PDMS gum |
| E1b | 60% HBP1, 40% ST Resin |
| E1c | 50% HBP1, 50% ST Resin |
| E1d | 40% HBP1, 60% ST Resin |
| E1e | 30% HBP1, 70% ST Resin |
| E2a | 33% HBP2, 66% ST Resin |

TABLE 1-continued

Example Formulations

| Example | Components |
|---|---|
| E1f | 50% HBP1, 50% PDMS gum |
| E1g | 60% HBP1, 40% PDMS gum |
| E1h | 95% POS, 5% HBP1 |
| E1i | 75% POS, 25% HBP1 |
| E1j | 50% POS, 50% HBP1 |

TABLE 2

Optical Properties

| | Refractive index | % Transmission | % Haze | % Clarity |
|---|---|---|---|---|
| CE1 | 1.4440 | 86.7 | 8.92 | 93.4 |
| CE2 | 1.4315 | 85.9 | 9.11 | 90.5 |
| CE3 | 1.4430 | 90.3 | 7.26 | 95.4 |
| C4 | 1.4483 | 87.1 | 8.08 | 92.8 |
| E1b | 1.4235 | 87.0 | 7.67 | 95.1 |
| E1c | 1.4290 | 87.1 | 7.72 | 95.3 |
| E1d | 1.4343 | 87.3 | 6.80 | 95.2 |

TABLE 3

Peel and Rheology Performance

| Example | 180° Peel oz/inch (N/dm) | Viscosity poise 23° C. | 50° C. | 80° C. | Shear modulus G' $Dyne/cm^2$ 23° C. | 50° C. | 80° C. |
|---|---|---|---|---|---|---|---|
| CE1 | 0 (0) | 8600 | 28080 | 4.7E5 | 54000 | 1.7E5 | 2.9E6 |
| E1a | 0 (0) | 4900 | 1700 | 350 | 20000 | 3000 | 250 |
| E1b | 36 (39) | 8900 | 3100 | 601 | 34000 | 7800 | 442 |
| E1c | 50 (55) | 18000 | 5700 | 950 | 75000 | 15000 | 830 |
| E1d | 65 (71) | 25000 | 7800 | 1600 | 90000 | 20000 | 2200 |
| CE2 | 14 (15) | 74000 | 1.4E5 | 2.2E5 | 4.6E5 | 8.4E5 | 1.4E6 |
| CE3 | 61 (67) | 3.3E5 | 2.8E5 | 2.1E5 | 2.1E6 | 1.7E6 | 1.3E6 |
| CE4 | 86 (94) | 2.2E5 | 1.4E5 | 88000 | 1.2E6 | 8.7E5 | 5.2E5 |

TABLE 4

Shear Performance

| Example | Shear/min (1 kg) |
|---|---|
| E1e | >10,000 |
| E2a | >10,000 |

TABLE 5

Effect on Peel Performance as Additive To Silicone Gum

| Example | 180° Peel g/inch (N/dm) |
|---|---|
| E1f | 28 (1.1) |
| E1g | 84 (3.2) |

TABLE 5-continued

Effect on Peel Performance as Additive To Silicone Gum

| Example | 180° Peel g/inch (N/dm) |
|---|---|
| CE5 | 0 (0) |
| CE6 | 0 (0) |

TABLE 6

Effect as Viscosity Reducing Process Aid

| | Viscosity poise | | | Shear modulus G' Dyne/cm² | | |
|---|---|---|---|---|---|---|
| Example | 23° C. | 50° C. | 80° C. | 23° C. | 50° C. | 80° C. |
| CE1 | 8600 | 28080 | 4.7E5 | 54000 | 1.7E5 | 2.9E6 |
| E1h | 3.5E5 | 4.7E5 | 4.0E5 | 2.2E6 | 2.9E6 | 2.5E6 |
| E1i | 3.1E5 | 2.8E5 | 2.0E5 | 2.0E6 | 1.7E6 | 1.2E6 |
| E1j | 17000 | 6100 | 1200 | 74000 | 16000 | 900 |

What is claimed is:

1. A hyperbranched polymer prepared from the reaction mixture consisting of: $AX_g$ and $BZ_m$
    wherein each X is either an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl; and
    —(CO) is a carbonyl group —C=O; or
    an amino-functional group of the formula:

—$NHR^3$, wherein $R^3$ is an H, an alkyl, or aryl group;
    A is either a group with the formula:

$W(—[—OSi(R^1)_2—]_n—O—Si(R^1)_2—Y—)_g$ wherein W is a single bond or a g-valent alkylene, arylene, heteroalkylene, or heteroarylene group;
    each $R_1$ is independently an alkyl, haloalkyl, aralkyl, alkenyl, aryl, or aryl substituted with an alkyl, alkoxy, or halo;
    each Y is independently an alkylene, aralkylene, or a combination thereof,
    each subscript n is independently an integer of 0 to 1500; and
    g is an integer of 2 or greater; or
    a g-valent alkylene, arylene, heteroalkylene, or heteroarylene group;
    where g is an integer of 2 or greater;
    B is either an m-valent alkylene, arylene, heteroalkylene, or heteroarylene group; or
    a group with the formula:

$W(—[—OSi(R^1)_2—]_n—O—Si(R^1)_2—Y—)_m$ wherein W is an m-valent alkylene, arylene, heteroalkylene, or heteroarylene group;
    each $R_1$ is independently an alkyl, haloalkyl, aralkyl, alkenyl, aryl, or aryl substituted with an alkyl, alkoxy, or halo;
    each Y is independently an alkylene, aralkylene, or a combination thereof, and
    each subscript n is independently an integer of 0 to 1500; and
    m is an integer of 3 or greater;
    each Z is either an amino-functional group of the formula:

—$NR^3H$ wherein $R^3$ is an H, an alkyl, or aryl group; or
    an oxalylamino-functional group of the formula:

—NH—(CO)—(CO)—$OR^2$, wherein each $R^2$ is independently an alkyl, haloalkyl, aryl, or aryl substituted with an alkyl, alkoxy, halo, or alkoxycarbonyl;
    —(CO) is a carbonyl group —C=O; and
    m is an integer of 3 or greater;
    such that X and Z form a reactive combination of oxalylamino-functional and amino-functional groups, wherein the polymers formed are hyperbranched polydiorganosiloxane polyoxamide segmented copolymers.

2. The hyperbranched polymer of claim 1, wherein $AX_g$ is a molecule of Formula I:

$$R^2-O-\underset{O}{\underset{\|}{C}}-\underset{O}{\underset{\|}{C}}-\left[\underset{H}{\underset{|}{N}}-Y-\underset{R^1}{\underset{|}{Si}}-\left(O-\underset{R^1}{\underset{|}{Si}}\right)_n-O-\underset{R^1}{\underset{|}{Si}}-Y-\underset{H}{\underset{|}{N}}-\underset{O}{\underset{\|}{C}}-\underset{O}{\underset{\|}{C}}\right]_p-O-R^2 \quad \text{Formula I}$$

wherein each $R_1$ is independently an alkyl, haloalkyl, aralkyl, alkenyl, aryl, or aryl substituted with an alkyl, alkoxy, or halo;
each $R^2$ is independently an alkyl, haloalkyl, aryl, or aryl substituted with an alkyl, alkoxy, halo, or alkoxycarbonyl;
each Y is independently an alkylene, aralkylene, or a combination thereof,
the subscript n is independently an integer of 0 to 1500; and
the subscript p is an integer of 1 to 10; and
$BZ_m$, is a molecule wherein
B is an m-valent alkylene, arylene, heteroalkylene, or heteroarylene group;
Z is an amine group of the formula —$NR^3H$ where $R^3$ is an H, an alkyl, or aryl group; and
m is an integer of 3 or greater.

3. The hyperbranched polymer of claim 2, wherein at least 50 percent of the $R^1$ groups are methyl.

4. The hyperbranched polymer of claim 2, wherein Y is an alkylene having 1 to 4 carbon atoms.

5. The hyperbranched polymer of claim 2, wherein p is at least 2.

6. The hyperbranched polymer of claim 2, wherein n is at least 40.

7. The hyperbranched polymer of claim 2, wherein B is an m-valent alkylene, or heteroalkylene, group;
Z comprises an amine group of the formula —$NR^3H$ where $R^3$ is an H; and m is an integer of 3.

8. The hyperbranched polymer of claim 2, wherein m is an integer greater than 3.

9. The hyperbranched polymer of claim 1, wherein $AX_g$ is a group wherein:

A is a g-valent alkylene, arylene, heteroalkylene, or heteroarylene group; and each X is an oxalylamino-functional group of the formula:

—NH—(CO)—(CO)—OR$^2$, wherein each $R^2$ is independently an alkyl, haloalkyl, aryl, or aryl substituted with an alkyl, alkoxy, halo, or alkoxycarbonyl; and —(CO) is a carbonyl group —C=O;

where g is an integer of 2 or greater; and

B is an m-valent group with the formula:

W(—[—OSi($R^1$)$_2$—]$_n$—O—Si($R^1$)$_2$—Y—)$_m$ wherein W is an m-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and each subscript n is independently an integer of 0 to 1500; and each Z is a —NR$^3$H group;

where $R^3$ is an H, an alkyl, or aryl group; and m is an integer of 3 or greater.

10. The hyperbranched polymer of claim 1, wherein the $AX_g$ compound is a polydiorganosiloxane diamine of Formula II:

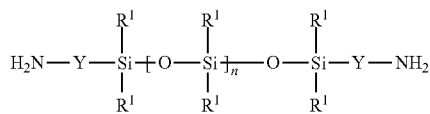

II wherein each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and the subscript n is independently an integer of 0 to 1500; and B is an m-valent alkylene, arylene, heteroalkylene, or heteroarylene group; and each Z comprises an oxalylamino-functional group of the formula:

—NH—(CO)—(CO)—OR$^2$, wherein each $R^2$ is independently an alkyl, haloalkyl, aryl, or aryl substituted with an alkyl, alkoxy, halo, or alkoxycarbonyl; and —(CO) is a carbonyl group —C=O; and wherein m is an integer of 3 or greater.

11. The hyperbranched polymer of claim 1, wherein the reaction mixtures comprises a molar excess of $Z_m$ groups relative to $X_g$ groups.

12. A method of forming a hyperbranched polymer consisting of providing a composition with compounds of the general Formula $AX_g$ wherein each X is either an oxalylamino-functional group of the formula:

—NH—(CO)—(CO)—OR$^2$, wherein each $R^2$ is independently an alkyl, haloalkyl, aryl, or aryl substituted with an alkyl, alkoxy, halo, or alkoxycarbonyl; and —(CO) is a carbonyl group —C=O; or an amino-functional group of the formula:

—NHR$^3$, where $R^3$ is an H, an alkyl, or aryl group;

A is either a group with the formula:

W(—[—OSi($R^1$)$_2$—]$_n$—O—Si($R^1$)$_2$—Y—)$_g$ wherein W is a single bond or a g-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and each subscript n is independently an integer of 0 to 1500; and g is an integer of 2 or greater; or a g-valent alkylene, arylene, heteroalkylene, or heteroarylene group;

where g is an integer of 2 or greater;

providing a composition with compounds of the general Formula $BZ_m$ wherein B is either an m-valent alkylene, arylene, heteroalkylene, or heteroarylene group; or a group with the formula:

W(—[—OSi($R^1$)$_2$—]$_n$—O—Si($R^1$)$_2$—Y—)$_m$ wherein W is an m-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and each subscript n is independently an integer of 0 to 1500; and m is an integer of 3 or greater;

each Z is either an amino-functional group of the formula: —NR$^3$H where $R^3$ is an H, an alkyl, or aryl group;

or an oxalylamino-functional group of the formula:

—NH—(CO)—(CO)—OR$^2$, wherein each $R^2$ is independently an alkyl, haloalkyl, aryl, or aryl substituted with an alkyl, alkoxy, halo, or alkoxycarbonyl;

—(CO) is a carbonyl group —C=O; and m is an integer of 3 or greater;

such that X and Z form a reactive combination of oxalylamino-functional and amino-functional groups; and mixing the compounds of $AX_g$ with the compounds of $BZ_m$, at room temperature to generate a hyperbranched polydiorganosiloxane polyoxamide polymer.

13. The method of claim 12, wherein the compounds of Formula $AX_g$ are of Formula I:

Formula I

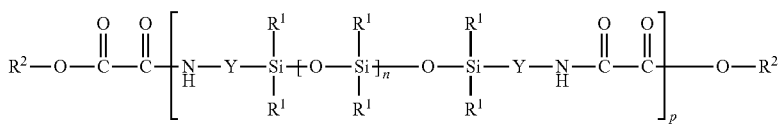

wherein each $R_1$ is independently an alkyl, haloalkyl, aralkyl, alkenyl, aryl, or aryl substituted with an alkyl, alkoxy, or halo;

each $R^2$ is independently an alkyl, haloalkyl, aryl, or aryl substituted with an alkyl, alkoxy, halo, or alkoxycarbonyl;

each Y is independently an alkylene, aralkylene, or a combination thereof, the subscript n is independently an integer of 0 to 1500; and the subscript p is an integer of 1 to 10; and the compounds of Formula $BZ_m$, are of:

wherein B is an m-valent alkylene, arylene, heteroalkylene, or heteroarylene group;

Z is an amine group of the formula —$NR^3H$ where $R^3$ is an H or an alkyl or aryl group;

m is an integer of 3 or greater.

14. The method of claim 12, wherein $AX_g$ is a group wherein:

A is a g-valent alkylene, arylene, heteroalkylene, or heteroarylene group; and each X is an oxalylamino-functional group of the formula:

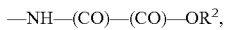

wherein each $R^2$ is independently an alkyl, haloalkyl, aryl, or aryl substituted with an alkyl, alkoxy, halo, or alkoxycarbonyl; and —(CO) is a carbonyl group —C=O;

where g is an integer of 2 or greater; and

B is an m-valent group with the formula:

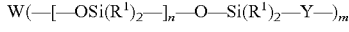

wherein W is an m-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, each subscript n is independently an integer of 0 to 1500; and each Z is a —$NR^3H$ group;

where $R^3$ is an H, an alkyl, or aryl group; and m is an integer of 3 or greater.

15. The method of claim 12, wherein the $AX_g$ compound is a polydiorganosiloxane diamine of Formula II:

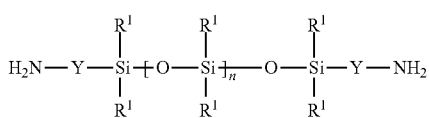

wherein each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and the subscript n is independently an integer of 0 to 1500; and B is an m-valent alkylene, arylene, heteroalkylene, or heteroarylene group; and each Z is an oxalylamino-functional group of the formula:

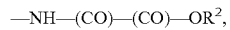

wherein each $R^2$ is independently an alkyl, haloalkyl, aryl, or aryl substituted with an alkyl, alkoxy, halo, or alkoxycarbonyl; and —(CO) is a carbonyl group —C=O; and wherein m is an integer of 3 or greater.

16. An article comprising a hyperbranched polydiorganosiloxane polyoxamide polymer, wherein the hyperbranched polymer is prepared from the reaction mixture consisting of: $AX_g$ and $BZ_m$ wherein each X is either an oxalylamino-functional group of the formula:

wherein each $R^2$ is independently an alkyl, haloalkyl, aryl, or aryl substituted with an alkyl, alkoxy, halo, or alkoxycarbonyl; and —(CO) is a carbonyl group —C=O; or an amino-functional group of the formula:

where $R^3$ is an H an alkyl, or aryl group:

A is either a group with the formula:

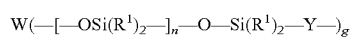

wherein W is a single bond or a g-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and each subscript n is independently an integer of 0 to 1500; and g is an integer of 2 or greater; or a g-valent alkylene, arylene, heteroalkylene, or heteroarylene group;

where g is an integer of 2 or greater;

B is either an m-valent alkylene, arylene, heteroalkylene, or heteroarylene group; or a group with the formula:

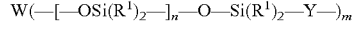

wherein W is an m-valent alkylene, arylene, heteroalkylene, or heteroarylene group;

each $R_1$ is independently an alkyl, haloalkyl, aralkyl, alkenyl, aryl, or aryl substituted with an alkyl, alkoxy, or halo;

each Y is independently an alkylene, aralkylene, or a combination thereof, and each subscript n is independently an integer of 0 to 1500; and m is an integer of 3 or greater;

each Z is either an amino-functional group of the formula:

—NR³H where R³ is an H, an alkyl, or aryl group; or an oxalylamino-functional group of the formula:

—NH—(CO)—(CO)—OR², wherein each R² is independently an alkyl, haloalkyl, aryl, or aryl substituted with an alkyl, alkoxy, halo, or alkoxycarbonyl;

—(CO) is a carbonyl group —C=O; and m is an integer of 3 or greater;

such that X and Z form a reactive combination of oxalylamino-functional and amino-functional groups, wherein the polymers formed are hyperbranched polydiorganosiloxane polyoxamide copolymers.

17. The article of claim 16, further comprising at least one additive.

18. The article of claim 17, wherein the at least one additive comprises a silicone tackifying resin, and the article comprises an adhesive article.

19. The article of claim 18, wherein the adhesive article comprises a pressure sensitive adhesive article.

20. The article of claim 17, wherein the at least one additive comprises at least one additional polymer, and the article comprises a polymer blend.

21. The article of claim 20, wherein the polymer blend comprises a majority of the at least one additional polymer.

22. The article of claim 16, further comprising a substrate with a first major surface and a second major surface, wherein the hyperbranched polydiorganosiloxane polyoxamide copolymer is coated on at least a portion of the first major surface of the substrate.

23. The article of claim 16, wherein the article comprises a film, a foam, or web, wherein the web comprises a melt blown web or a non-woven web.

* * * * *